US011083242B2

(12) United States Patent
Bongers

(10) Patent No.: US 11,083,242 B2
(45) Date of Patent: Aug. 10, 2021

(54) ARTICLE OF FOOTWEAR, AND METHOD FOR MANUFACTURING SUCH AN ARTICLE

(71) Applicant: Dunlop Protective Footwear B.V., Raalte (NL)

(72) Inventor: Elroy Bongers, Amersfoort (NL)

(73) Assignee: Dunlop Protective Footwear B.V., Raalte (NL)

( * ) Notice: Subject to any disclaimer, the term of this patent is extended or adjusted under 35 U.S.C. 154(b) by 0 days.

(21) Appl. No.: 16/367,291

(22) Filed: Mar. 28, 2019

(65) Prior Publication Data

US 2019/0297991 A1 Oct. 3, 2019

(30) Foreign Application Priority Data

Mar. 29, 2018 (EP) .................................... 18165213
Apr. 19, 2018 (EP) .................................... 18168214

(51) Int. Cl.
*A43B 23/08* (2006.01)
*A43B 7/14* (2006.01)
(Continued)

(52) U.S. Cl.
CPC .............. *A43B 7/141* (2013.01); *A43B 23/06* (2013.01); *A43B 23/088* (2013.01); *A43B 23/16* (2013.01);
(Continued)

(58) Field of Classification Search
CPC ....... A43B 23/088; A43B 23/08; A43B 23/16; A43B 23/17; A43B 23/22; A43B 23/07; A43B 1/10
(Continued)

(56) References Cited

U.S. PATENT DOCUMENTS 1,122,884 A * 12/1914 Eliason .................. A43B 23/07 36/55
1,185,119 A * 5/1916 Marshall .................. A43B 3/02 36/4
(Continued)

FOREIGN PATENT DOCUMENTS

EP 1016353 A2 7/2000
EP 1016353 A3 7/2000
(Continued)

*Primary Examiner* — Marie D Bays
(74) *Attorney, Agent, or Firm* — N.V. Nederlandsch Octrooibureau; Catherine A. Shultz; Katelyn J. Bernier

(57) ABSTRACT

An article of footwear (10) that includes a liner (30), an upper (14), and an insert (50). The liner has an inward surface (31) that encloses an inner void (18) for accommodating a foot, and an outward surface (32) that defines a rear shaft portion (38), a heel portion (36), and a sole portion (35). The upper has a midsole portion (42), and surrounds the rear shaft portion, the sole portion, and the heel portion of the liner. The insert is formed as a single body of material with increased hardness and stiffness relative to the upper. This insert is arranged between the liner and the upper, and includes a protruding portion (54), a heel counter (56), and a shank (58). The protruding portion extends upwards from the heel counter and along the rear shaft portion, and provides a guiding trajectory for a heel during insertion into the inner void.

16 Claims, 16 Drawing Sheets

(51) Int. Cl.

| | |
|---|---|
| ***A43B 23/06*** | (2006.01) |
| ***B29D 35/00*** | (2010.01) |
| ***B29D 35/04*** | (2010.01) |
| ***B29D 35/08*** | (2010.01) |
| ***A43B 23/22*** | (2006.01) |
| ***A43B 23/16*** | (2006.01) |
| *A43B 1/10* | (2006.01) |

(52) U.S. Cl.
CPC .......... *A43B 23/22* (2013.01); *B29D 35/0036* (2013.01); *B29D 35/04* (2013.01); *B29D 35/084* (2013.01); *A43B 1/10* (2013.01); *A43B 7/142* (2013.01); *A43B 7/144* (2013.01); *A43B 7/1445* (2013.01)

(58) Field of Classification Search
USPC ................................ 36/4, 75 R, 69, 107, 87
See application file for complete search history.

(56) References Cited

U.S. PATENT DOCUMENTS

| | | | | | |
|---|---|---|---|---|---|
| 2,229,387 | A * | 1/1941 | Parker | A43B 7/32 36/4 |
| 2,507,726 | A * | 5/1950 | Hollier | A43B 3/04 36/45 |
| 3,333,353 | A | 8/1967 | Garcia | |
| 4,823,420 | A * | 4/1989 | Bartneck | A43B 17/14 12/142 N |
| 4,869,001 | A | 9/1989 | Brown | |
| 5,595,006 | A * | 1/1997 | Perrissoud | A43B 5/04 36/117.5 |
| 5,647,150 | A * | 7/1997 | Romanato | A43B 3/0084 12/142 R |
| 5,996,257 | A * | 12/1999 | Harrison | A43B 7/32 36/107 |
| 6,594,922 | B1 | 7/2003 | Mansfield et al. | |
| 6,748,676 | B1 * | 6/2004 | Chenevert | A43B 3/26 36/10 |
| 6,871,424 | B2 * | 3/2005 | Labonte | A43B 5/1666 36/115 |
| 6,880,272 | B2 | 4/2005 | Wells | |
| 8,074,375 | B2 * | 12/2011 | Longuet | A43B 23/028 36/3 R |
| 8,778,251 | B2 * | 7/2014 | Yang | B29D 35/126 264/294 |
| 8,883,058 | B2 | 11/2014 | Cook et al. | |
| 9,421,726 | B2 * | 8/2016 | Scofield | B29D 35/126 |
| 2002/0162250 | A1 * | 11/2002 | Campbell | A43B 7/142 36/166 |
| 2004/0103561 | A1 * | 6/2004 | Campbell | A43B 7/142 36/88 |
| 2004/0134101 | A1 * | 7/2004 | Chen | A43B 1/10 36/55 |
| 2005/0034330 | A1 | 2/2005 | Baychar | |
| 2005/0126044 | A1 | 6/2005 | Langley | |
| 2010/0064548 | A1 | 3/2010 | Hansen | |
| 2010/0186255 | A1 * | 7/2010 | Avar | A43B 17/16 36/10 |
| 2011/0083286 | A1 | 4/2011 | Yang | |
| 2012/0304495 | A1 * | 12/2012 | Brabson | A43B 7/12 36/87 |
| 2013/0239439 | A1 | 9/2013 | Ludemann et al. | |
| 2015/0031258 | A1 | 1/2015 | Baychar | |
| 2015/0230553 | A1 | 8/2015 | Bacino et al. | |
| 2015/0351490 | A1 * | 12/2015 | Lam | A43B 13/42 36/108 |
| 2016/0255905 | A1 * | 9/2016 | Tarrier | A43B 7/148 |

FOREIGN PATENT DOCUMENTS

| | | | |
|---|---|---|---|
| EP | 1021964 | A2 | 7/2000 |
| EP | 2777419 | A1 | 9/2014 |
| EP | 2878219 | A1 | 6/2015 |
| GB | 2249940 | A | 5/1992 |
| WO | 2004039197 | A1 | 5/2004 |

* cited by examiner

ARTICLE OF FOOTWEAR, AND METHOD FOR MANUFACTURING SUCH AN ARTICLE

CROSS REFERENCE TO RELATED APPLICATIONS

This application claims the benefit of and priority to European application number 18165213.2 filed on 29 Mar. 2018, and European application number 18165213.2 filed on 19 Apr. 2018, which are hereby incorporated by reference in their entirety.

TECHNICAL FIELD

The invention relates to an article of footwear, and to a method for manufacturing such an article.

BACKGROUND ART

An article of footwear that covers a user's ankle (e.g. a boot or high-top) is typically either of the slip-on type or of the type that includes a tightening mechanism for temporarily holding the footwear securely against the foot when worn. Both types of footwear define an internal void with an outer contour that resembles a foot shape. To facilitate foot entry and exit for slip-on footwear, the internal void is often substantially larger than the volume of the foot associated with the proper size of the article of footwear.

It may be helpful to set forth definitions of certain terms to be used herein. The noun "upper" refers herein to the material part of footwear that directly covers and accommodates a wearer's foot. The upper may be conceptually subdivided into several regions, like the nose, the instep, the heel, etc. In the case of boots, the upper may extend further upwards to form a "shaft" that also covers the ankles and a portion of the lower leg. The "instep" forms a middle section of the upper, and extends between the nose and the heel. The instep covers a metatarsal region of the wearer's foot. The term "sole" refers herein to the material(s) located directly below and supporting the wearer's foot. The sole may be formed by separate layers. The upper may include a midsole portion that is an integral part of and forms a lower side of the upper, in such a way that the instep and midsole portion jointly enclose the inner void. A separate insole may also be provided, for example formed or placed as a layer arranged on the inside of the article of footwear e.g. inside and directly on top of the midsole portion of the upper. The outsole is formed on the lower exterior side of the midsole portion, and is adapted to directly engage a supporting surface (e.g. the ground) while walking.

In known manufacturing techniques, a last is typically used to temporarily occupy and delineate the boundaries of the internal void. The article can be formed by stitching or adhering various layers of fabric, textile, leather, or synthetic material together over the last, and/or by providing additional moulding components around the last to enable moulding of plastic materials. The upper and midsole portion of the footwear may be formed in an initial manufacturing stage. An outsole may be added to the underside of the upper in a subsequent manufacturing stage (e.g. by adhering, moulding, or other attachment methods).

The rigidity, flexibility, and fit of the article of footwear may be modified by interposing various material layers with desired properties in specific regions. Rigid components may for instance be added to increase the strength and support characteristics of the footwear in specific areas, and/or to improve the fit for relatively large internal voids wherein the foot would otherwise slide around.

Patent document U.S. Pat. No. 6,594,922B1 describes an orthotic stabilizer member for use in a shoe. This stabilizer member comprises a plantar support portion, which extends substantially along the length of the shoe sole. The stabilizer member also includes lateral and medial sidewalls, which extend upwards from the plantar support portion, as well as a heel counter. The described member forms a medial/lateral counter stabilizer that can be integrated in commercially manufactured shoes, to provide arch support and heel alignment. The stabilizer member in U.S. Pat. No. 6,594,922B1 is less suited for use in boots or high tops.

It would be desirable to provide an article of footwear with an insert that yields improved comfort and/or support for the wearer.

SUMMARY OF INVENTION

Therefore, according to a first aspect of the invention, there is provided an article of footwear, which may for instance be formed as a boot or high-top. The article of footwear comprises a liner, an upper and an insert. The liner defines an inward surface that encloses an inner void for accommodating a foot, and defines an outward surface that defines at least a rear shaft portion, a heel portion, and a sole portion. The upper includes a midsole portion, and surrounds at least the rear shaft portion, the sole portion, and the heel portion of the liner. The insert is arranged between the liner (on an inwards side of the insert) and the upper (on an outwards side of the insert). The insert is formed of a material with an increased hardness and stiffness relative to the upper and the midsole portion, and forms a single (i.e. unitary) body of interconnected portions, which includes a protruding portion, a heel counter, and a shank. The protruding portion extends upwards from the heel counter and along the rear shaft portion of the liner, and provides a guiding trajectory for a heel of the foot when inserted into the inner void.

The unitary insert with the integrated shank, the heel counter, and the protruding portion forms a single stabilizer member with three-fold functionality. The shank forms an integral part of the insert, and extends from the heel portion along the sole and to the region near the toes, to form a reinforcing arch support between the heel and the frontal region of the foot sole. The shank may confer increased stiffness and torsional resistance against rotational deformation of the sole portion about a longitudinal direction (i.e. against rotation of the nose portion relative to the heel portion, about a nominal axis that extends from the heel to the toes). The heel counter also forms an integral part of the insert, and extends around lateral and rear parts of the liners heel portion, to confer increased rigidity to the article's heel portion. An inward surface of the heel counter conforms to the outward heel surface, which helps to reduce or prevent sliding of the heel within the inner void. The heel counter may confer increased stiffness and compressional resistance against linear deformation of the heel portion along a transverse direction (i.e. between lateral sides of the heel portion). The protruding portion forms an integral part of the insert that resembles a shoehorn structure for guiding the heel when the foot is inserted into the inner void. The protruding portion projects predominantly upwards over a predetermined distance from an upper rear portion of the heel counter. This distance is at least half the vertical dimension of a human heel i.e. half the height of the heel bone (calcaneus), measured from the foot sole (plantar aspect) for a foot corresponding to the size of the footwear.

According to an embodiment, the upper and midsole portion are integrally formed of molded flexible material. The hardness of flexible material of the upper and the midsole portion may be quantified by a shore hardness in a range from 30 to 70 shore A (metric for indentation hardness by a durometer or shore hardness test DIN ISO 868:2003).

The upper and midsole portion are preferably molded directly onto the liner and insert by an injection moulding process—for instance via reaction injection moulding (RIM) of a thermosetting polymer, or injection moulding of a thermoplastic polymer—yielding a flexible continuous (i.e. unitary) layer of molded material that tightly envelops the liner and insert. The molded material may be fixed to the liner and to the insert that covers part of the liner. The proposed insert may thus be incorporated in an article of footwear that is manufactured via a process based largely on known injection moulding techniques, and which requires no or relatively little adaptation of the existing moulding components (e.g. the last, moulding shells, and sole plates).

According to a further embodiment, the insert is embedded in the flexible material of the upper and the midsole portion. The insert may be efficiently embedded in the material of the upper and midsole portion during moulding thereof, to achieve and maintain a correct position of the insert within the article of footwear. The insert may be embedded within the material of the upper and midsole portion, so that an outward surface of the insert lies receded relative to (i.e. within and below) the directly surrounding inward surface of the upper and midsole portion. An inward surface of the insert may be level with the directly surrounding inward surface of the upper and midsole portion, so that the inward surfaces of the insert, the upper, and the midsole portion jointly form a smooth continuous inward surface that abuts and envelops part or all of the outward surface of the liner.

In embodiments, the heel counter extends along the heel portion of the liner and is adapted to surround the heel of the foot. The heel counter may include a rear wall and side walls that extend up to but excluding an ankle portion of the liner, to leave the ankles of the foot uncovered. The heel counter may cover and enclose the heel but not the ankles (medial malleolus and lateral malleolus), to prevent sliding of the heel within the inner void while maximizing wearing comfort.

In embodiments, the shank extends along more than 80% of the sole portion of the liner, to provide support to both the arch and the ball of the foot. The proposed shank may extend along more than 80%, for instance along 85%, of the length of the sole, measured from the distal end of the heel. The shank thus extends at least up to and beyond the ball i.e. underneath the heads of the metatarsal bones of the foot, to facilitate transitioning between various phases of foot placement (in particular the transition between the foot-flat, mid-stance, and heel-off phases) in a gait cycle.

In embodiments, the insert is formed as a curved continuous shell, which defines an inward surface that is essentially congruent to an outward surface of the liner. The curved continuous shell (i.e. monocoque) body may be accurately placed along the liner in a reproducible manner. The continuous shell may be quickly designed and efficiently formed from plastics using known moulding techniques. In this particular context, the term "essentially congruent" pertains to an insert with an inwards surface that is largely form-fitting with the outward surface of the liner, although the shape of the insert may locally deviate from the liner to provide additional effects. The shell may have a thickness in a range between 0.5 and 3 millimeters, and preferably between 1 and 2 millimeters. This thickness may vary within this range along the surface of the shell. In alternative embodiments, the insert may be formed by a ribbed frame.

In embodiments, the protruding portion is arranged between the liner and the upper, so that the rear shaft portion of the liner urges and pivots the protruding portion rearwards along the negative longitudinal direction, and relative to a nominal transverse axis through a pivot region on the heel counter. The rearwards deflection of the protruding portion is a deformation relative to a mechanical equilibrium shape of the insert in which the protruding portion is tilted slightly forwards relative to the heel counter. The rearwards deflection imparts a pre-stress on the protruding portion and pivot region. Conversely, the embedded, pre-stressed protruding portion exerts a forward moment on the rear shaft portion of the liner as well as on the heel and Achilles tendon of a foot in the inner void. The resulting inwards moment improves the internal grip exerted by the liner and insert on the heel, and yields increased wearing comfort.

The upper edge of the protruding portion may be rotationally deflected rearwards relative to the heel counter and shank over an arc length and about a pivot region on the heel counter. In exemplary embodiments, a ratio of the edge deflection arc length to a length of the protruding portion may be in a range of 5% to 15%, and preferably about 10%. For instance, for a protruding portion with a vertical length of about 100 millimeters, the arc length may be in a range from 5 to 15 millimeters, and may for instance be approximately 10 millimeters.

In further embodiments, the side walls of the heel counter are bounded on upper ends by upper side edges that border a top opening. In a rest state of the insert (i.e. when not subjected to external stress), the top opening may have a width W1 that is slightly narrower than a wearer's heel, so as to only allow the heel to be inserted into the heel counter if sufficient downwards force is exerted. In the rest state of the insert, the upper side edges may be curved inwards relative to the side walls, so that an inner width W2 between the side walls provides ample space for the wearer's heel whereas the opening width is smaller than the inner width.

The reduced width of the top opening relative to the (maximum) inner width of the central part of the heel counter ensures that the heel becomes enclosed and restrained from above, once properly inserted into the heel counter. The side walls of the heel counter are sufficiently flexible and resilient to temporarily flex transversally outwards, when the wearer's heel is inserted via the top opening, and to flex inwards again to enclose the inserted heel. A ratio W1:W2 of the opening width W1 to the inner width W2 may be in a range between 0.55 and 0.65, and preferably between 0.57 and 0.63. The (maximum) inner width may be only slightly larger than a heel width at the broadest part of the calcaneus, for a foot corresponding to the article's size. Similarly, the opening width for the insert in its rest state may be only slightly larger than a width of the narrower upper heel part that is located between the malleoli and the calcaneus. In this particular context, "slightly larger" refers to additional width margins that take into account the thickness of the enclosed liner (which, depending on liner type, may contribute an additional width of about 0.6 to 6 millimeters), and possibly also inter-human variations in foot width (which, depending on foot size, may contribute an additional width of 2 to 4 millimeters). For a Euro foot size 43, the maximum inner width may for instance be in a range between 63 millimeters and 71 millimeters, for instance about 68 millimeters. This maximum inner width may increase (decrease) with about 1.5 millimeter for integer increments (decrements) of Euro foot size. Similarly, for Euro foot size 43, the opening width may be in a range between 37 millimeters and 41 millimeters, for instance about 39 millimeters. The opening width may increase (decrease) with about 0.7 millimeter for integer increments (decrements) of Euro foot size.

In embodiments, the insert comprises a heel aperture with a smoothly curved periphery on a lower side of the liner's heel portion. The center of the heel aperture is located directly below the calcaneus of the wearer's foot. This aperture forms a through hole on a lower heel side, which extends entirely through the thickness of the insert between the inward and outward surfaces thereof. At the heel portion of the article of footwear, the flexible material of the midsole portion may extend through this heel aperture in the insert, to directly butt against the liner and form a flexible absorbing pad for the wearer's heel.

The periphery of the heel aperture preferably defines a closed smooth curve without inflection points, for instance an elliptical (e.g. circular) shape, to improve comfort. An exemplary circular heel aperture may have a diameter in a range from 30 millimeters to 60 millimeters.

In embodiments, the insert consists essentially of a fiber reinforced plastic material, for instance of a glass fiber reinforced thermoplastic polyurethane (TPU). The glass fiber reinforced (GFR) TPU may have a GF-content of 10% to 30%, and preferably about 20%. A hardness of the GFRTPU may be in a range from 50 to 75 shore D (DIN ISO 7619-1 test procedure), and preferably from 60 to 70 shore D. The E-modulus of the GFRTPU may be in a range from 350 to 3000 Megapascal (DIN EN ISO 527 test procedure), and preferably from 1000 to 2000 Megapascal.

In embodiments, the flexible material of the upper and the midsole portion consists essentially of a thermosetting or thermoplastic elastomer, preferably of polyurethane (PU). Preferably, this elastomer has lower hardness and stiffness than the material of the insert.

According to a second aspect, and in accordance with the advantages and effects described herein above, there is provided a method for manufacturing an article of footwear, for instance a boot or high-top. The method involves:

- providing a last to delineate an inner void in the article for accommodating a foot;
- positioning a liner over the last, so that an outward surface of the liner defines at least a rear shaft portion, a heel portion, and a sole portion;
- providing an insert that is formed as a single (i.e. unitary) body of interconnected portions, including a protruding portion, a heel counter, and a shank, wherein the protruding portion extends upwards from the heel counter to provide a guiding trajectory for a heel;
- positioning the insert over the liner, so that the protruding portion of the insert covers the rear shaft portion of the liner, the heel counter of the insert covers a heel portion of the liner, and the shank of the insert covers a sole portion of the liner, and
- forming an upper with a midsole portion around the insert and the liner, thereby enclosing the insert between the liner and the upper and midsole portion.

In an embodiment, the method further includes:

- positioning at least one moulding shell on upper lateral side(s) around the last with the liner and the insert, to delineate an outward surface of the upper;
- positioning a sole plate on a lower side of the last with the liner and the insert to delineate an outward surface of the midsole portion, thus forming a moulding cavity for the upper and the midsole portion between the last with the liner and the insert on the one hand, and the at least one moulding shell and the sole plate on the other hand, and
- forming the upper and the midsole portion and enclosing the insert by injection moulding of a flexible material into the moulding cavity.

This method embodiment allows manufacturing of an article of footwear with an insert according to the first aspect, while using injection moulding techniques that are known per se. This method requires no or relatively little adaptation of existing moulding components (e.g. the last, moulding shells, and sole plate).

In a further embodiment, the flexible moulding material is a thermosetting or thermoplastic elastomer, preferably PU.

According to a third aspect, and in accordance with the advantages and effects described herein above, there is provided an insert adapted for use in combination with an article of footwear in accordance with the first aspect. The insert comprises a protruding portion, a heel counter, and a shank that jointly form a single (i.e. unitary) body. The protruding portion extends upwards from the heel counter, is adapted to be positioned along a rear shaft portion of a liner of the article of footwear, and provides a guiding trajectory for a heel of the foot when inserted into the inner void.

In further embodiments, the insert comprises one or more of the features described herein above with reference to the first aspect.

BRIEF DESCRIPTION OF DRAWINGS

Embodiments will now be described, by way of example only, with reference to the accompanying schematic drawings in which corresponding reference symbols indicate corresponding parts.

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures. In the next figures, Cartesian coordinates will be used to describe spatial relations. Reference symbol X is used to indicate a longitudinal direction, which may correspond to a direction along a sole of an article of footwear. Prepositions “front” and “rear” pertain to this direction X. Reference symbol Y is used to indicate a transversal direction that is perpendicular to X. This direction Y relates to the terms “left”, “right”, and “lateral”. Reference symbol Z is used to indicate a vertical direction that is perpendicular to X and Y. This direction Z may co-extend along a shaft of the article of footwear. Prepositions “above” and “below” relate to this direction Z. It should be understood that the directional definitions and preferred orientations presented herein merely serve to elucidate geometrical relations for specific embodiments, but should not be considered limiting to the scope of the invention or claims.

The term “surface” is used herein to generally refer to two-dimensional parametric surface regions, which may have either a planar (e.g. a polygonal surface), curved (e.g. cylindrical, spherical, parabolic surface, etc.), recessed (e.g. saw-tooth or undulated surface), or even a complex shape.

Figure 1:
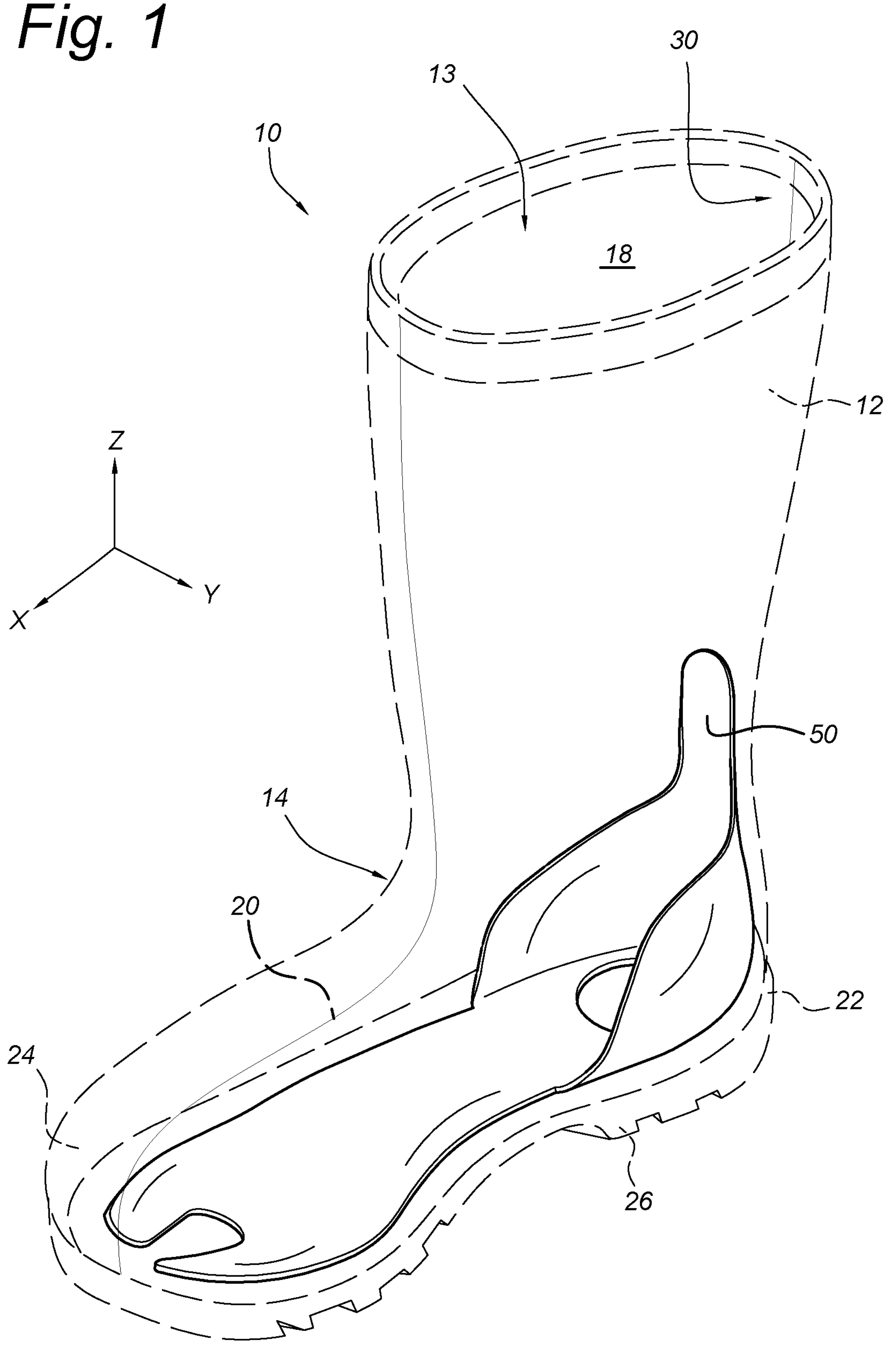
FIG. 1 schematically shows a perspective view of an article of footwear according to an embodiment.

FIG. 1 schematically shows a perspective view of an article of footwear 10 according to an embodiment. In this example, the article is formed as a boot 10, which includes i.a. an upper 14 and an outsole 26. On a top side, the boot 10 defines an insertion opening 13 that provides a path to an inner void 18, which is defined inside the boot 10 and is adapted for accommodating a foot. The upper 14 includes various parts, including a shaft 12, an instep 20, a nose 24, and a heel part 22. The instep 20 extends along the longitudinal direction X, and the shaft 12 extends along the vertical direction Z.

The boot 10 comprises a liner 30 that extends along an inward surface of the upper 14, and which borders the inner void 18. Inside the boot 10, a structural insert 50 is provided, which is adapted to extend along the plantar aspect, the heel, and part of the Achilles tendon of the wearer’s foot (when inside void 18). This insert 50 is interposed between the liner 30 and the upper 14.

Figure 2:
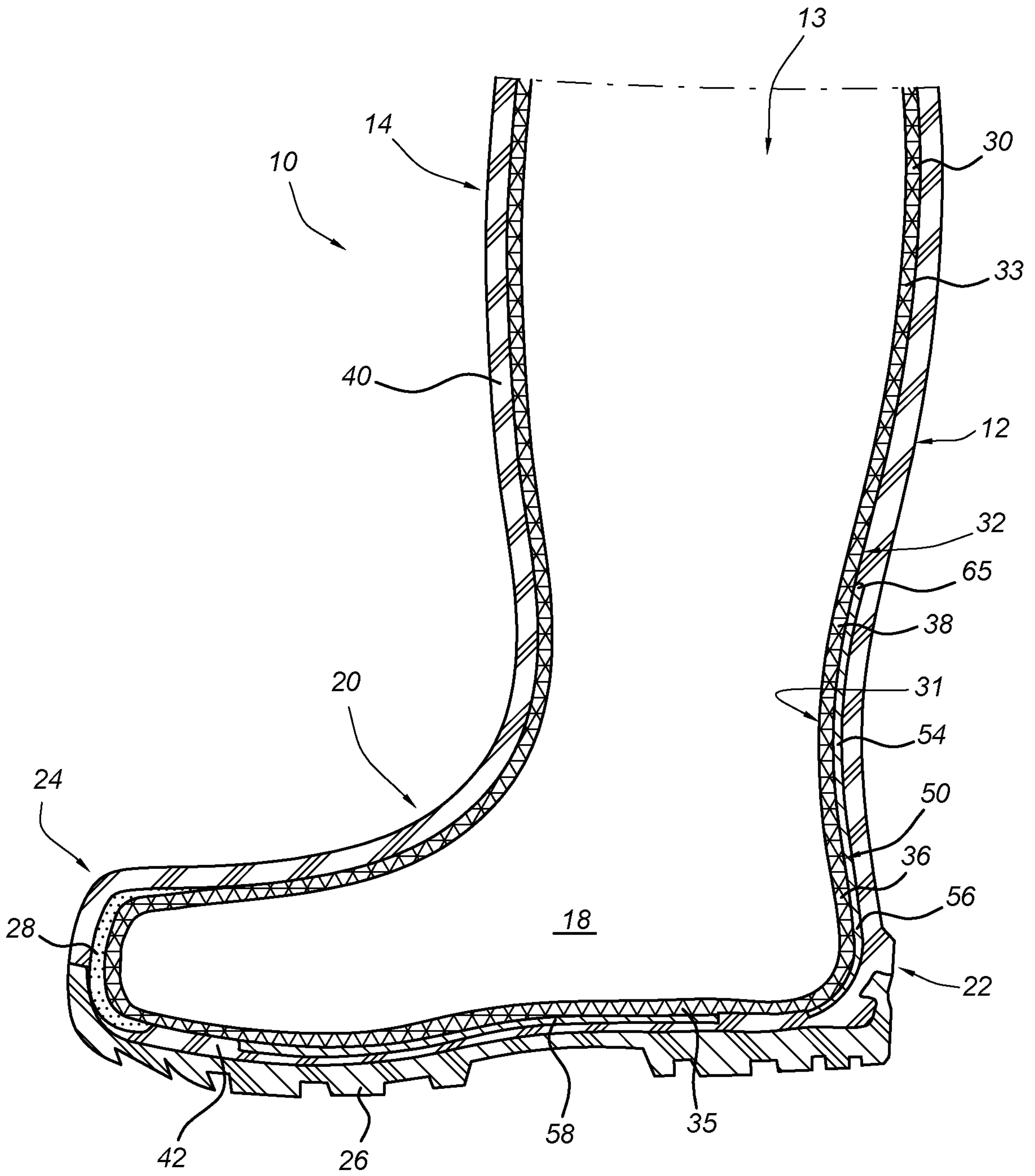
FIG. 2 schematically shows a cross-sectional side view of the article of footwear from FIG. 1.

FIG. 2 schematically shows a cross-sectional side view of the boot 10 from FIG. 1. The liner 30 defines an inward surface 31 that encloses the inner void 18. On an outward surface 32, the liner 30 defines a rear shaft portion 38, a heel portion 36, and a sole portion 35.

The upper 14 includes and extends into a midsole portion 42 on a lower side. The upper 14 with midsole portion 42 envelops the liner 30, and is formed by injection moulding of a flexible plastic material. In this exemplary embodiment, a RIM process is employed and the flexible material consists essentially of thermosetting polyurethane.

Insert 50 is formed by a monocoque body (FIGS. 3*a*-3*c*), which in this example is manufactured by injection moulding of a glass fiber reinforced TPU material and (in cured state) has a hardness and stiffness exceeding those of the upper 14. An outward surface 53 of the insert 50 faces towards and abuts part of an inward surface of the upper 14 and the midsole portion 42. The inward surface 52 of the insert 50 faces inwards towards void 18 and abuts the outward surface 32 of the liner 30. The insert 50 is embedded in the flexible material of the upper 14 and the midsole portion 42, such that the inward surface 52 of the insert 50 is substantially level and forms a smooth continuum with the directly surrounding inward surface portions of the upper 14 and midsole portion 42, and such that the outward surface 53 of the insert 50 is sunken (recessed) within the flexible material and lies below the directly surrounding inwards surface portions of the upper 14 and midsole portion 42.

The insert 50 includes a protruding portion 54, a heel counter 56, and a shank 58. The insert 50 is adapted to facilitate inserting a foot into the boot 10, and to resist deformation of the midsole portion 42 and the heel part 22 when the boot 10 is worn. The heel counter 56 extends along the heel portion 36 of the liner 30, and is adapted to surround the wearer’s heel. The shank 58 is interposed between the outsole 42 and the sole portion 35 of the liner 30, and is adapted to extend along the arch and beyond the ball of the wearer’s foot.

The protruding portion 54 projects upwards from an upper rear portion of the heel counter 56, and forms a shoehorn structure for guiding the heel when the foot is inserted into void 18. The protruding portion 54 extends up to a rear edge 65, which is embedded in the material of the upper 14 and is located below the rim of the upper 14 that surrounds the insertion opening 13.

FIG. 2 further illustrates that the boot 10 may include a separate toecap 28, which is arranged in the nose 24 and also interposed between the upper 14 and the liner 30. Such a toecap 28 may for instance be made from metal, rigid plastic, or wood, and protects the wearer’s toes against crushing forces from heavy objects.

Figure 3A:
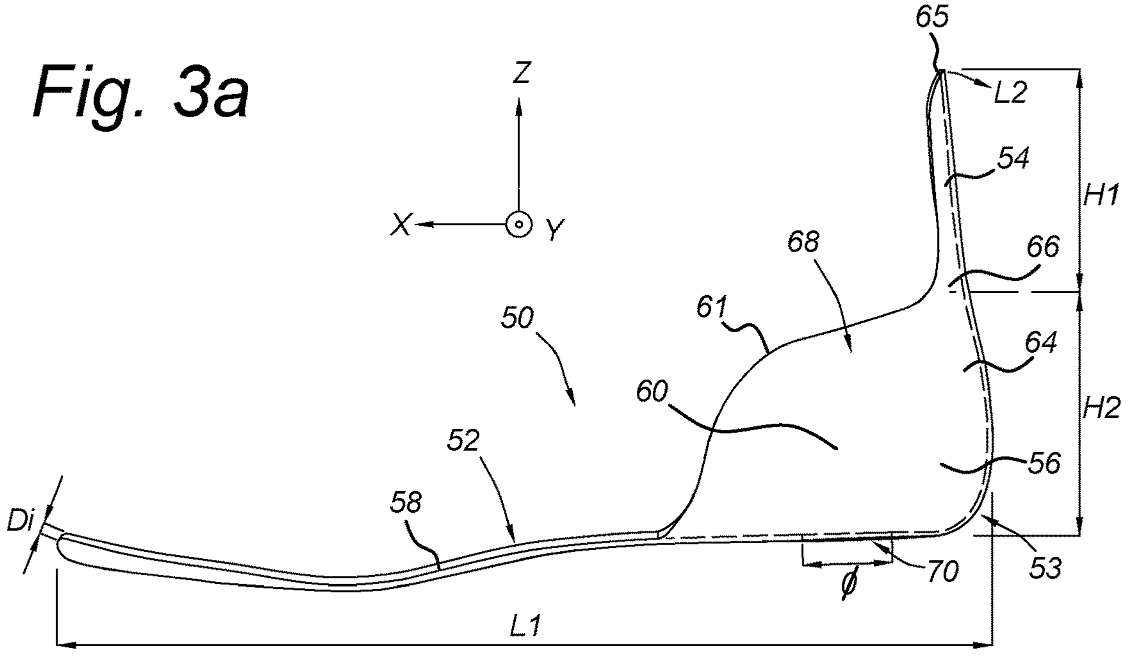
FIGS. 3*a*-3*c* schematically show perspective views of the structural insert according to an embodiment.
Figure 3B:
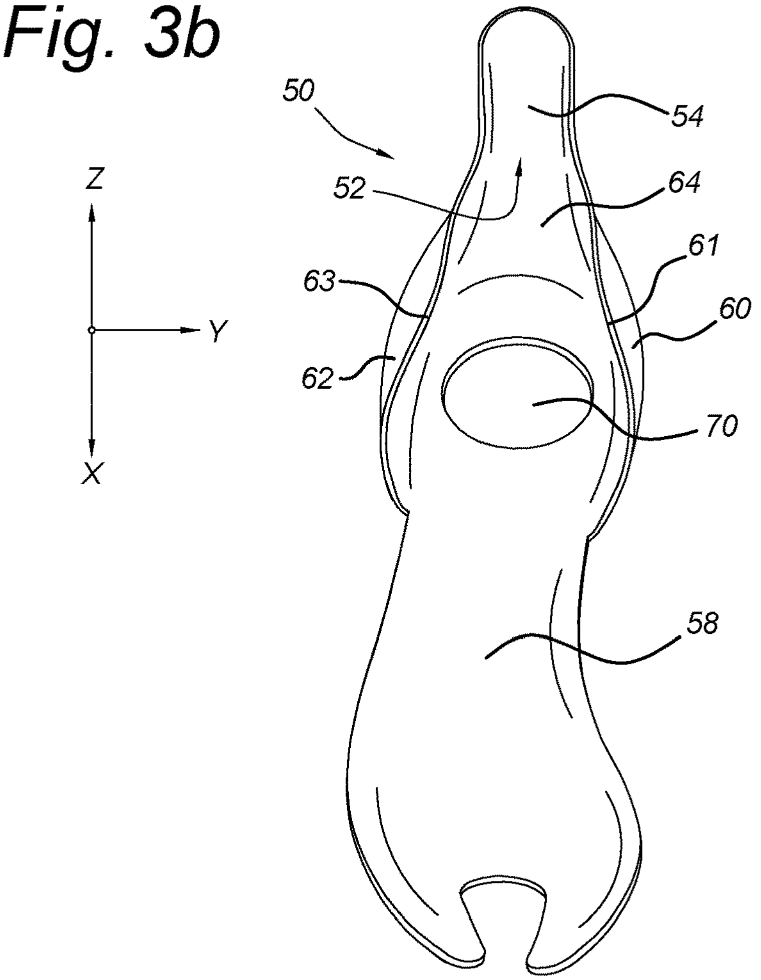
Figure 3C:
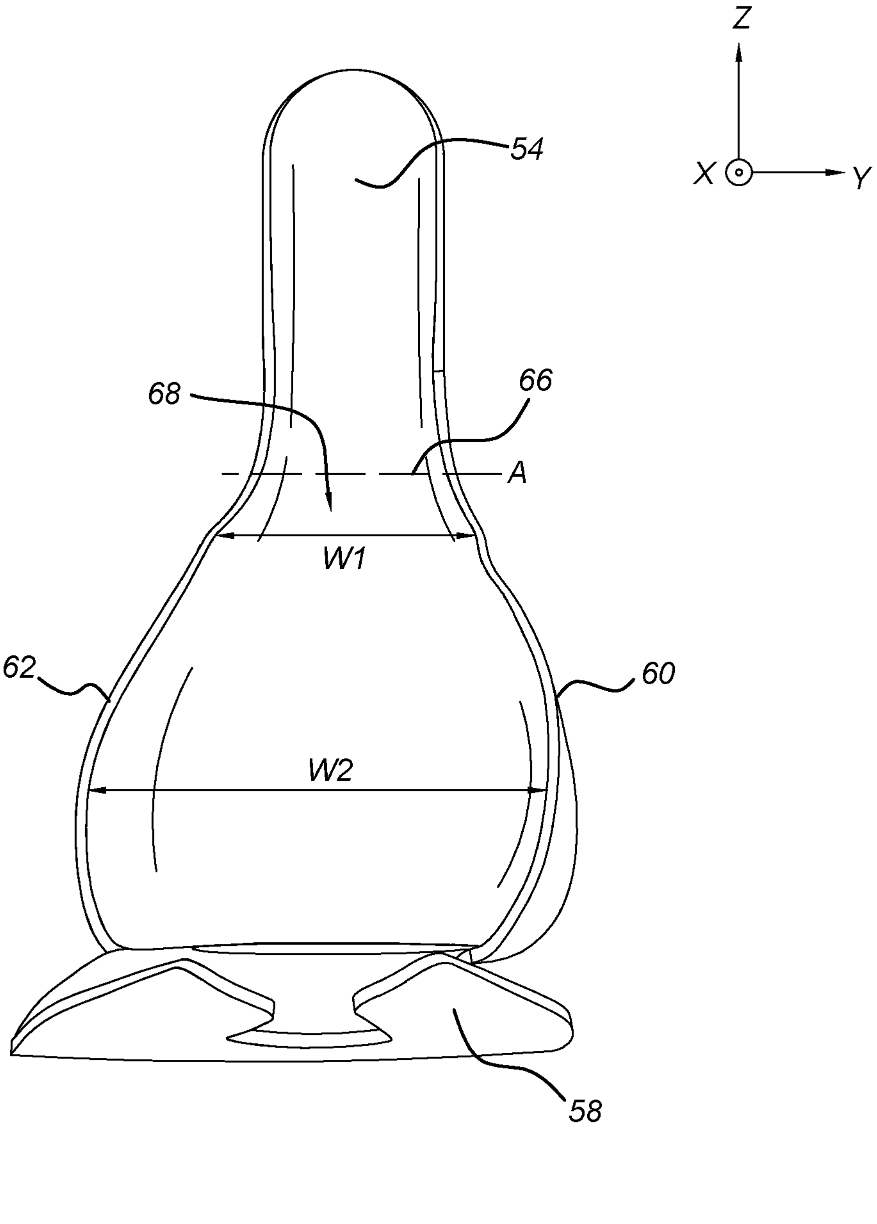

FIGS. 3*a*-3*c* schematically show perspective views of the structural insert 50, which is to be integrated in an article of footwear, for instance in the boot 10 from FIGS. 1-2. The insert 50 forms a curved continuous shell, which defines an inward surface 52 that is essentially congruent to part of the outward surface 32 of a liner 30. The shell has a thickness Di that varies in a range between 0.5 and 3 millimeters along the surface of the shell.

The heel counter 56 defines two sidewalls 60, 62 and a rear wall 64. The sidewalls 60, 62 are adapted to enclose the wearer’s heel from lateral sides, and are mutually connected via the rear wall 64. The heel counter 56 thus forms a concave body that is adapted to extend around and cover the wearer’s heel.

The sidewalls 60, 62 extend on two lateral sides upwards along the vertical direction +Z. Each sidewall 60, 62 defines a respective upper edge 61, 63. These edges 61, 63 jointly delimit a top opening 68 from lateral directions. The sidewalls 60, 62 extend up to just below the ankles of the foot (i.e. without covering the ankles), thus leaving the medial and lateral malleoli of the foot exposed.

Each edge 61, 63 curves inwardly towards the other, to create a reduced opening dimension below the ankle. The top opening 68 is relatively small, having a width W1 that is less than a maximum internal width W2 between central regions of the sidewalls 60, 62 (FIG. 3*c*). The width W1 of the top opening 68 is slightly smaller than a maximum heel width. The upper edges 61, 63 are sufficiently flexible to allow temporarily outward flexing, if subjected to downwards (or upwards) and sideways forces from a heel that is pressed downwards into (or pulled upwards out of) the heel counter 56.

The protruding portion 54 projects upwards over a distance H1 from the rear wall 64 of the heel counter 56, and extends along a rear shaft portion 38 of the liner 30 to provide a guiding trajectory for a heel that is inserted via the shaft 12 into the inner void 18. This distance H1 is at least half the height of the human calcaneus. A width of a lower part of the protruding portion 54 that is nearest to the heel counter 56 is smaller than a width of an upper part of the protruding portion 54 that is nearest to the upper rear edge 65, thereby locally reducing bending resistance and forming a pivot region 66 that allows flexing of the protruding portion 54 along the longitudinal direction X, about a nominal pivot axis A extending in the transverse direction Y through the pivot region 66, and relative to the sidewalls 60, 62 and the rear wall 64.

In the transition region in which the shank 58 extends into the heel counter 56, the insert 50 comprises a heel aperture 70 with a circular shape. The location of this heel aperture 70 corresponds to the heel portion 36 of the liner 30, and allows the flexible material of the midsole portion 42 to extend through this heel aperture 70 to form a flexible pad for the wearer's heel. A cross-sectional dimension Ø of this heel aperture 70 is about 40 millimeters.

In FIG. 3*a*, an arrow is shown to schematically indicate a rearwards (i.e. clockwise) pivot direction for the upper edge 65 of the protruding portion 54. Once the structural insert 50 is integrated/embedded in the article 10 (see e.g. FIGS. 1-2), the protruding portion 54 is subjected to a rearwards pre-stress along the negative longitudinal direction −X and relative to the pivot region 66. During moulding of the article, this rearwards pre-stress is exerted by a last 82 on the protruding portion 54. The pre-stress will be largely maintained by the liner 30 after moulding has completed. As a result of this pre-stress, the upper edge 65 of portion 54 of the embedded insert 50 is deflected rearwards over an arc length L2 of approximately 10 millimeters about pivot region 66, relative to the slightly forwards sloped equilibrium position of the protruding portion 54 in the insert 50 as such. The resulting pre-stress causes the protruding portion 54 to exert a forward moment on the liner 30 and the heel and Achilles tendon of the foot accommodated in the inner void 18, and thus improves internal grip. The initial arc length preferably exceeds L2, to take the resilient counter-force of the liner 30 into account.

The heel profile of a human foot on the inwards facing side generally differs from that on the outwards facing heel side. As shown in FIG. 3*c*, the insert preferably has an asymmetric contour, to accommodate this difference. Inserts for the left foot and the right foot are then formed in pairs, with mirror-symmetric shapes.

FIGS. 4*a*-4*d* schematically illustrate a method for manufacturing an article of footwear, for instance a boot 10 as shown in FIGS. 1-2*b*.

Figure 4A:
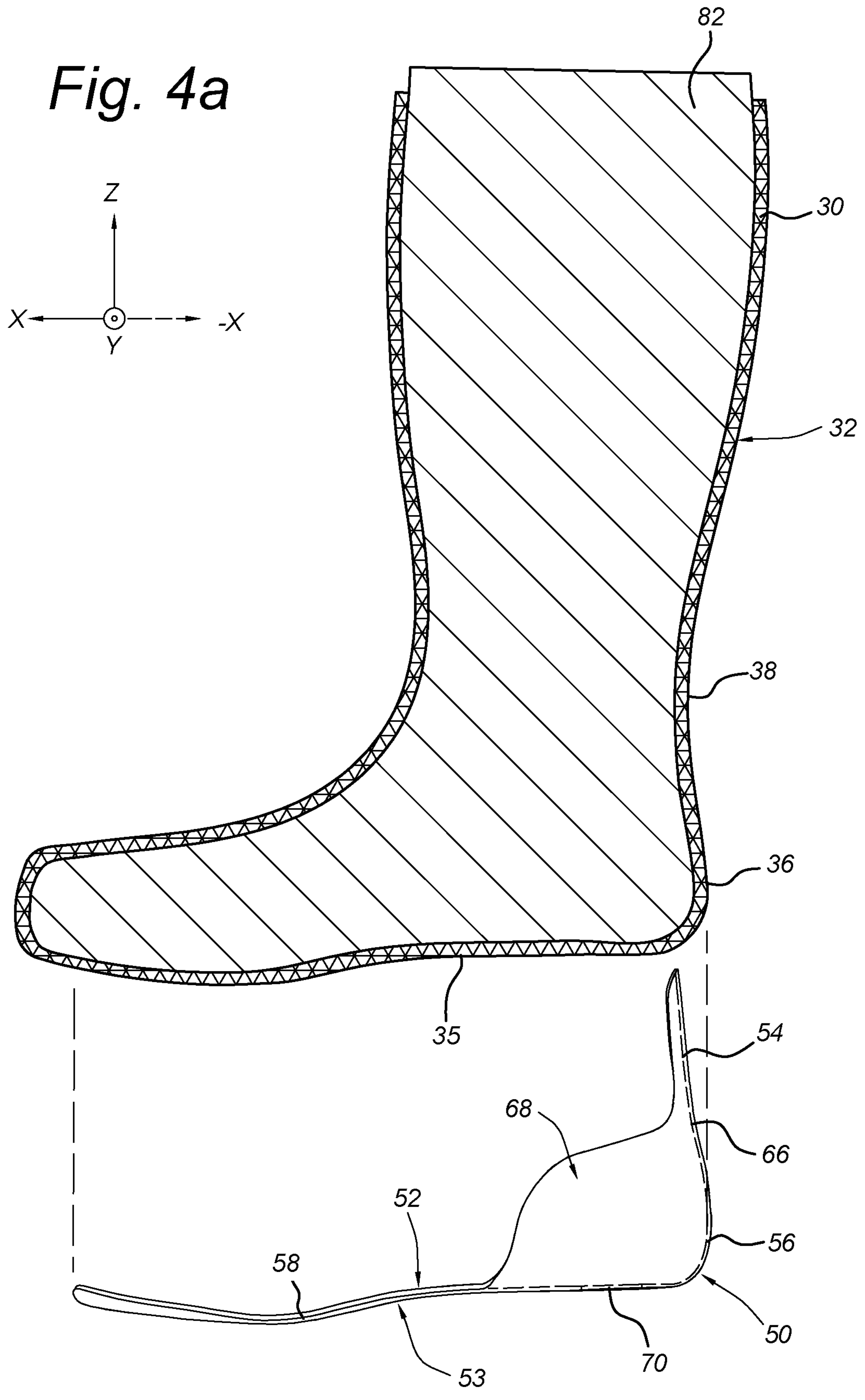
FIGS. 4*a*-4*d* schematically show embodiments of a moulding method according to an embodiment.

FIG. 4*a* illustrates the initial provision of a last 82, which serves to temporarily occupy an inner void 18 of the boot 10 (see FIG. 1) during subsequent moulding stages. A liner 30 is placed around the last 82, so that an outward surface 32 of the liner 30 defines i.a. a rear shaft portion 38, a heel portion 36, and a sole portion 35.

Subsequently, an insert 50 is provided, which is formed as a monocoque body and includes a protruding portion 54, a heel counter 56, and a shank 58, which are interconnected.

The protruding portion 54 extends upwards from the heel counter 56. This insert 50 has a mechanical equilibrium shape in which the protruding portion 54 is tilted forwards along the positive longitudinal direction X relative to the heel counter 56 and the shank 58.

The insert 50 is placed on the outward surface 32 of the liner 30, so that the protruding portion 54 covers the rear shaft portion 38 of the liner 30, that the heel counter 56 covers the heel portion 36 of the liner 30, and that the shank 58 covers the sole portion 35 of the liner 30. When the insert 50 is placed over the last 82 and liner 30, the rear shaft portions of liner 30 and last 82 urge and pivot the protruding portion 54 of the insert 50 clockwise (i.e. rearwards along the negative longitudinal direction −X) about pivot region 66 on heel counter 56, to impart a pre-stress on the protruding portion 54.

Figure 4B:
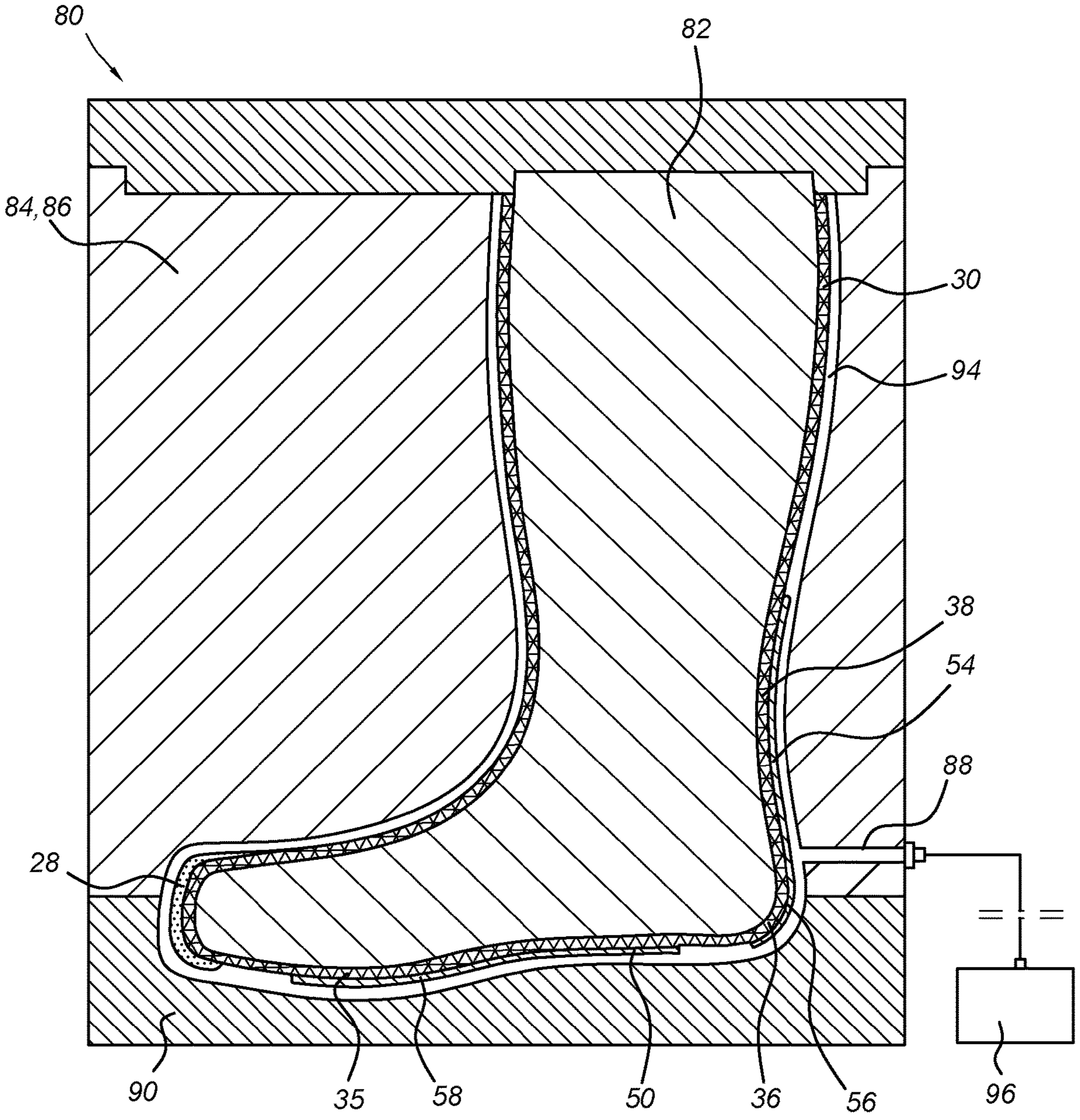
Figure 4C:
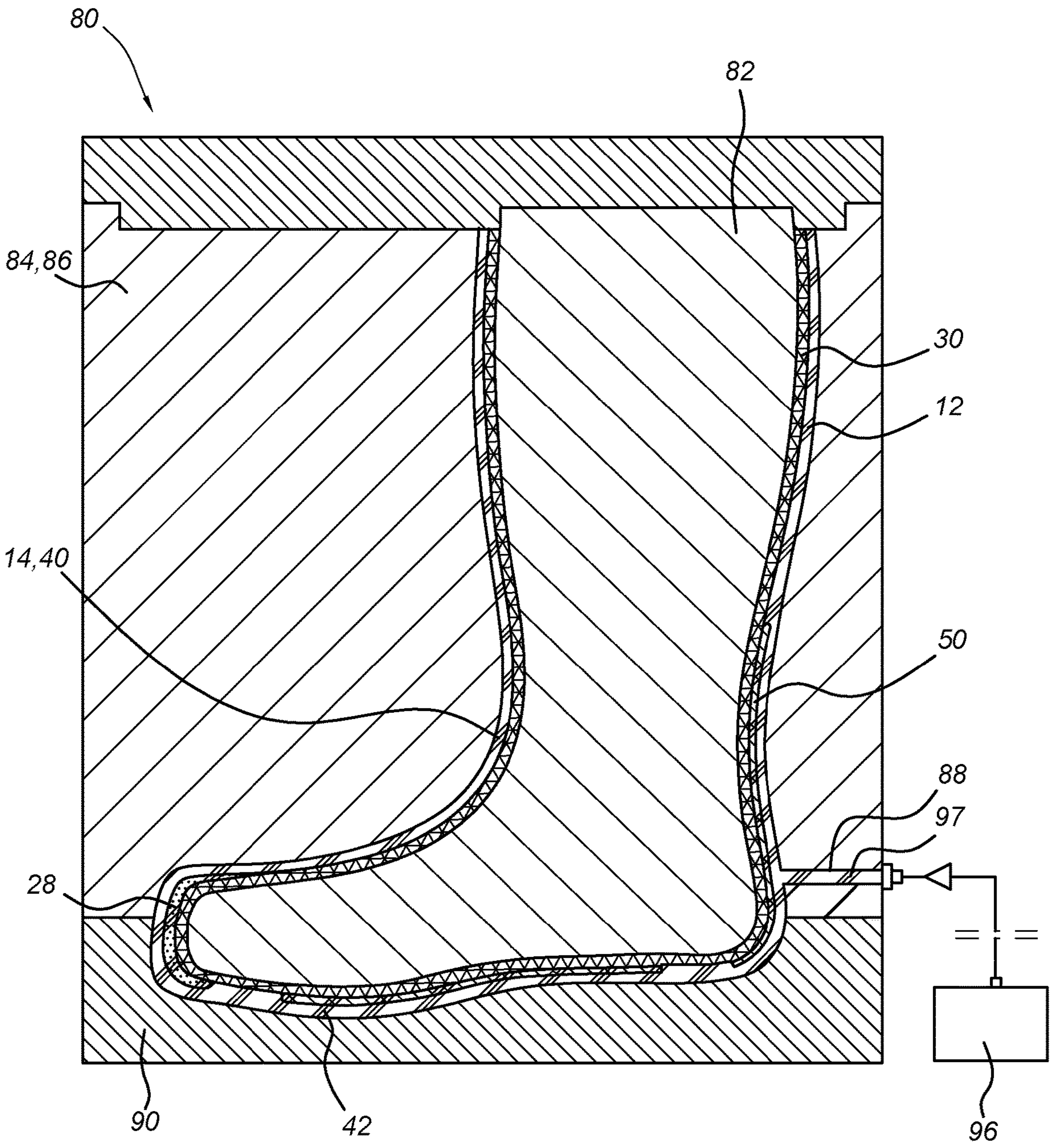
Figure 4D:
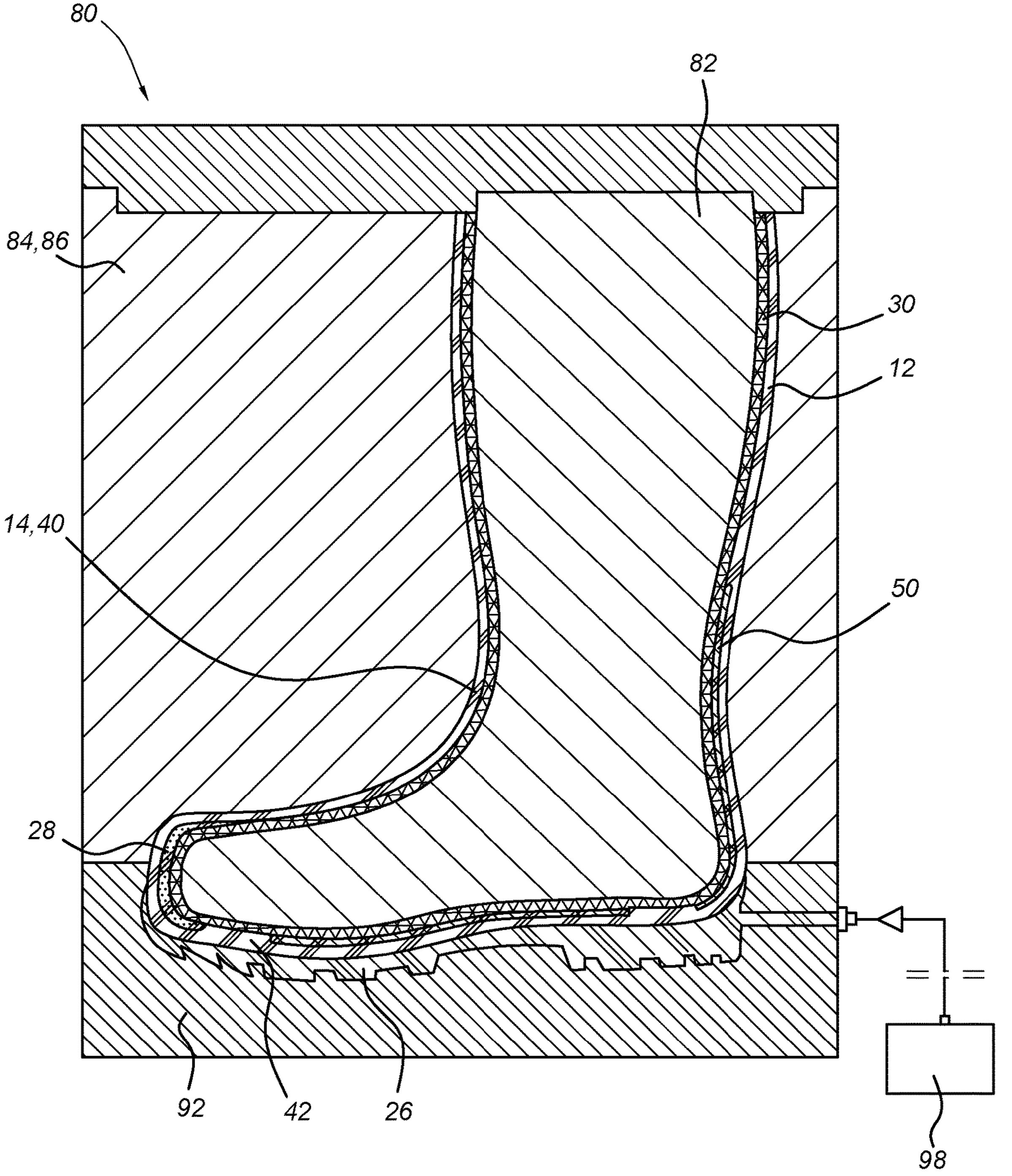

FIGS. 4*b*-4*d* schematically shows details of a moulding system 80, including moulding shells 84, 86, a blind sole plate 90, a second sole plate 92, and supply mechanisms 96, 98 for supplying injection moulding material 97. In this example, the moulding material 97 is a PU. Relative movability of the last 82, moulding shells 84, 86, and sole plates 90, 92 is obtained by dedicated positioning mechanisms, which have been omitted in FIGS. 4*b*-4*d* for clarity.

The last 82 with the liner 30 and insert 50 is placed in a space enclosed by the outer moulding shells 84, 86 and the blind plate 90. A moulding cavity 94 is defined between a joint inner surface of the outer moulding shells 84, 86 and the blind plate 90 on the one hand, and a joint outer surface 32, 53 of the liner 30 and the insert 50 on the other hand.

FIG. 4*c* illustrates that a liquid moulding material 97 is injected by source mechanism 96, via a supply channel 88 through a heel part of moulding shells 84, 86, into the moulding cavity 94. The injected moulding material 97 is allowed to cure, to form the upper 14 with the midsole portion 42. In the resulting arrangement, the insert 50 is enclosed between the liner 30 and the resulting upper 14, and is partially embedded in the material of the upper 14.

As illustrated in FIG. 4*d*, the blind plate 90 is removed from the lower part of the moulding shells 84, 86 and the midsole portion 42, after the upper 14 has cured. The blind plate 90 is replaced by the second sole plate 92 with a different profile, to form an outsole cavity below the cured midsole portion 42. Liquid moulding material is injected by source 98 into this outsole cavity, and this material is allowed to cure to form the outsole 26 of the boot 10.

Figure 5A:
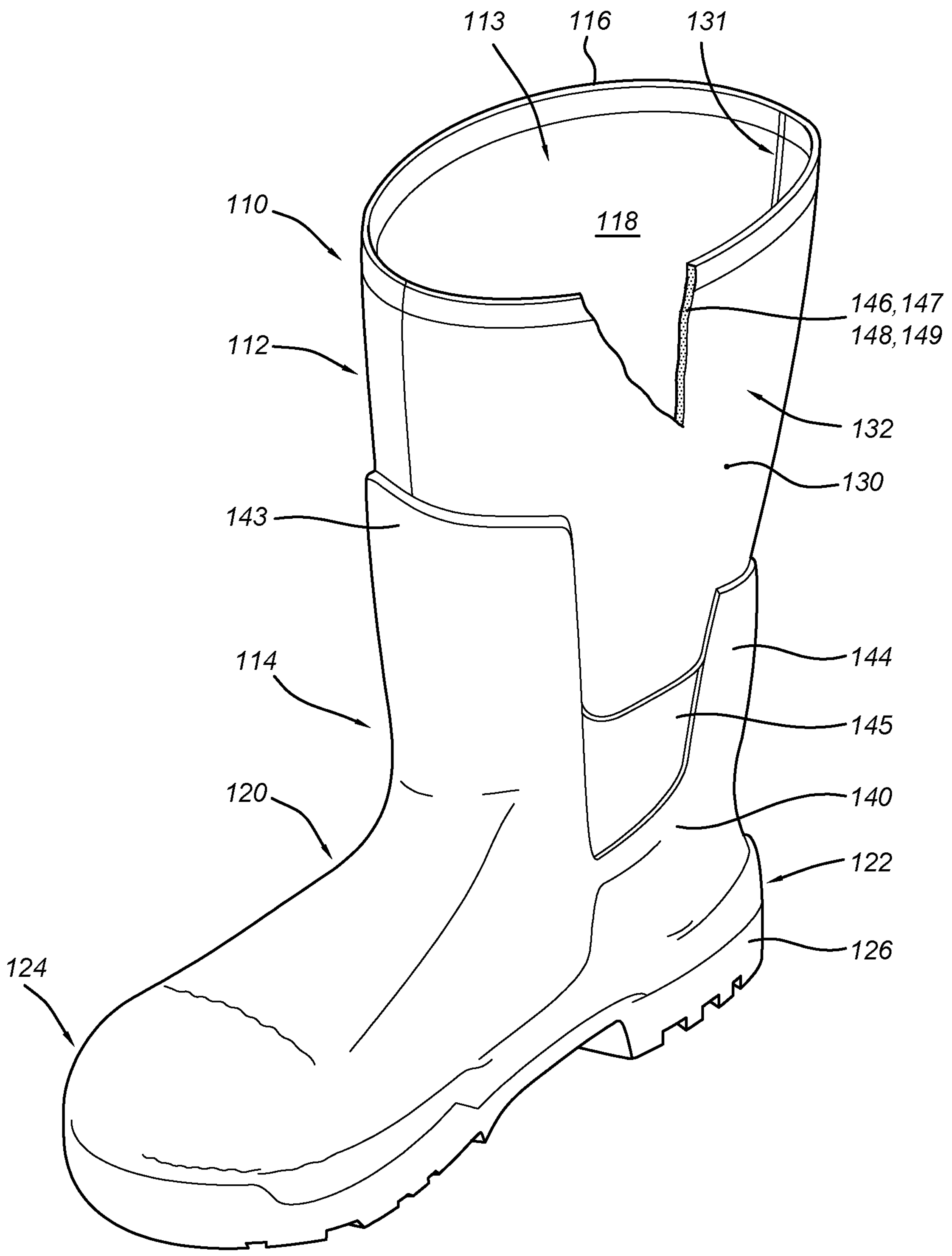
FIGS. 5*a* and 5*b* schematically show perspective views of an article of footwear according to an alternative embodiment.
Figure 5B:
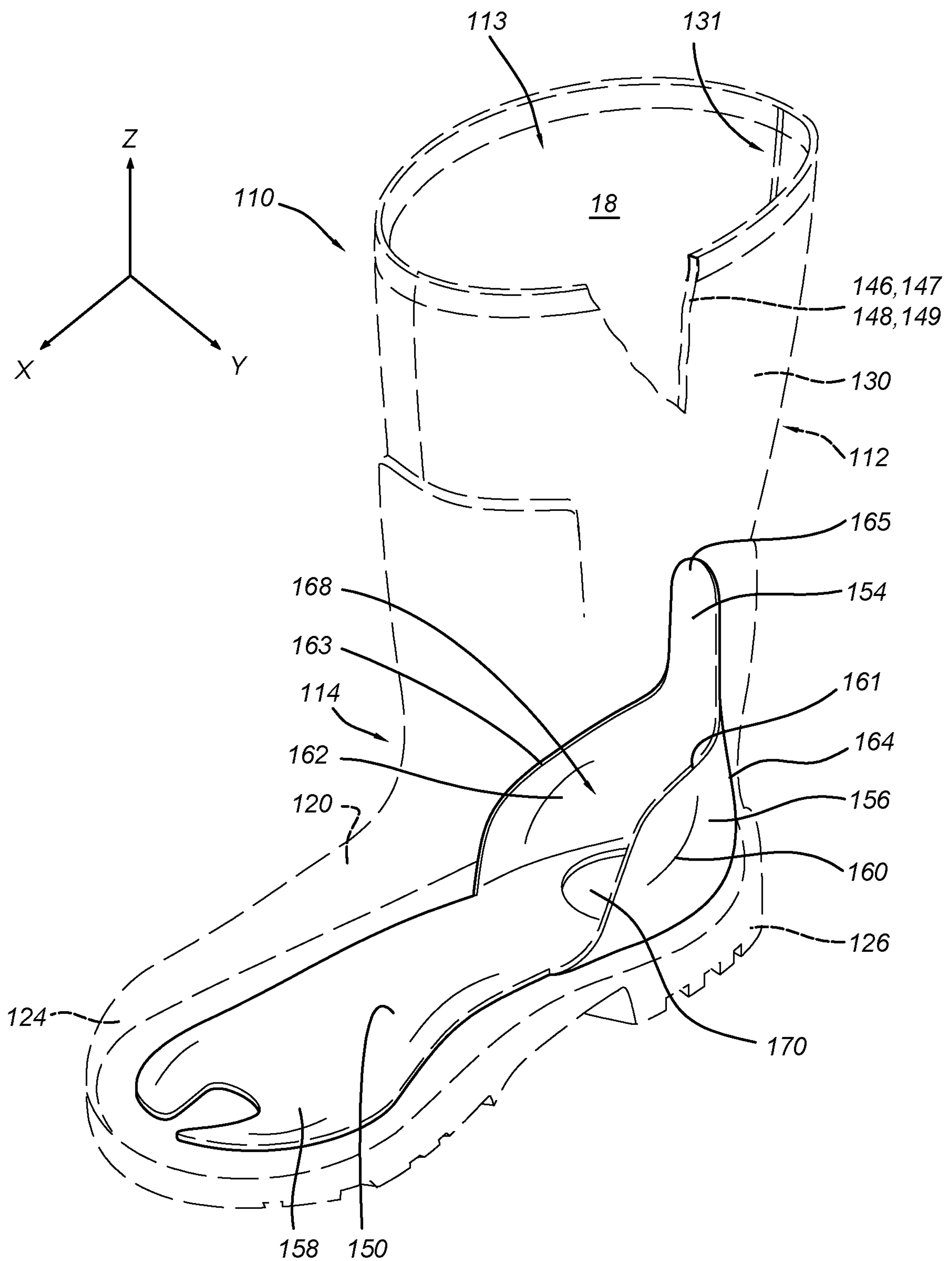

FIGS. 5*a* and 5*b* schematically show an embodiment of a boot 110 for outdoor activities, which provides optimal wearer comfort. The boot 110 includes an upper 114, a shaft 112, and an outsole 126. The upper 114 includes an instep 120 with a heel 122 and a nose 124. The shaft 112 extends upwards towards an upper edge 116. This upper edge 116 bounds an insertion opening 113 that provides a path to a void 118 inside the boot 110, which is adapted for accommodating a wearer's foot. Other features in the boot 110 that have already been described above with reference to the boot 10 in FIGS. 1-3*c* may also be present in boot 110, and will not all be discussed here again. For the discussion with reference to FIGS. 5*a*-6*b*, like features are designated with similar reference numerals preceded by 100, to distinguish the embodiments.

The upper 114 includes a sock-shaped liner 130 and a molded shell 140. The liner 130 forms a full-foot sock around the interior void 118, with a shape and size that closely match those of the wearer's foot. The shell 140 forms an enveloping layer that partially covers and encloses the liner 130. The liner 130 is flexible and compressible, and provides a comfortable fit for securing the foot inside the boot 110. The liner 130 forms a waterproof but breathable sock, which is composed of a laminate of flexible material layers 146, 147, 148, 149. FIGS. 5*a*-5*b* show a (virtual) partial cut-out near the upper edge 116 of the liner 130, to show a cross-section of material layers 146, 147, 148, 149. This layer arrangement will be further explained with reference to FIG. 6*c*.

The shell 140 and the outsole 126 both consist essentially of relatively rigid elastomeric materials, for instance polyurethane (PU). These elastomeric materials provide durability and strength to the boot 110, and jointly form a fluid-impermeable outer structure that encloses the foot region of the interior void 118 in a watertight manner. The liner 130 is only partially covered by the shell 140, and extends upwards beyond the shell 140 to form the shaft 112 with an exposed outward surface 132 that is not covered by the shell 140.

FIG. 5*b* shows that a structural insert 150 is provided on the inside of boot 110. This insert 150 is enclosed between the liner 130 and the shell 140, and is adapted to extend along the plantar aspect, the heel, and part of the Achilles tendon of the wearer's foot (when inside void 118). The insert 150 forms a curved monocoque body, which has an increased hardness and stiffness relative to the shell 140, and which defines an inward surface 152 that is essentially congruent to part of the outward surface 132 of the liner 130. In this example, the insert 150 includes a protruding portion 154, a heel counter 156, and a shank 158, and has similar properties as in the embodiments described herein above (e.g. FIGS. 3*a*-3*c*).

Figure 6A:
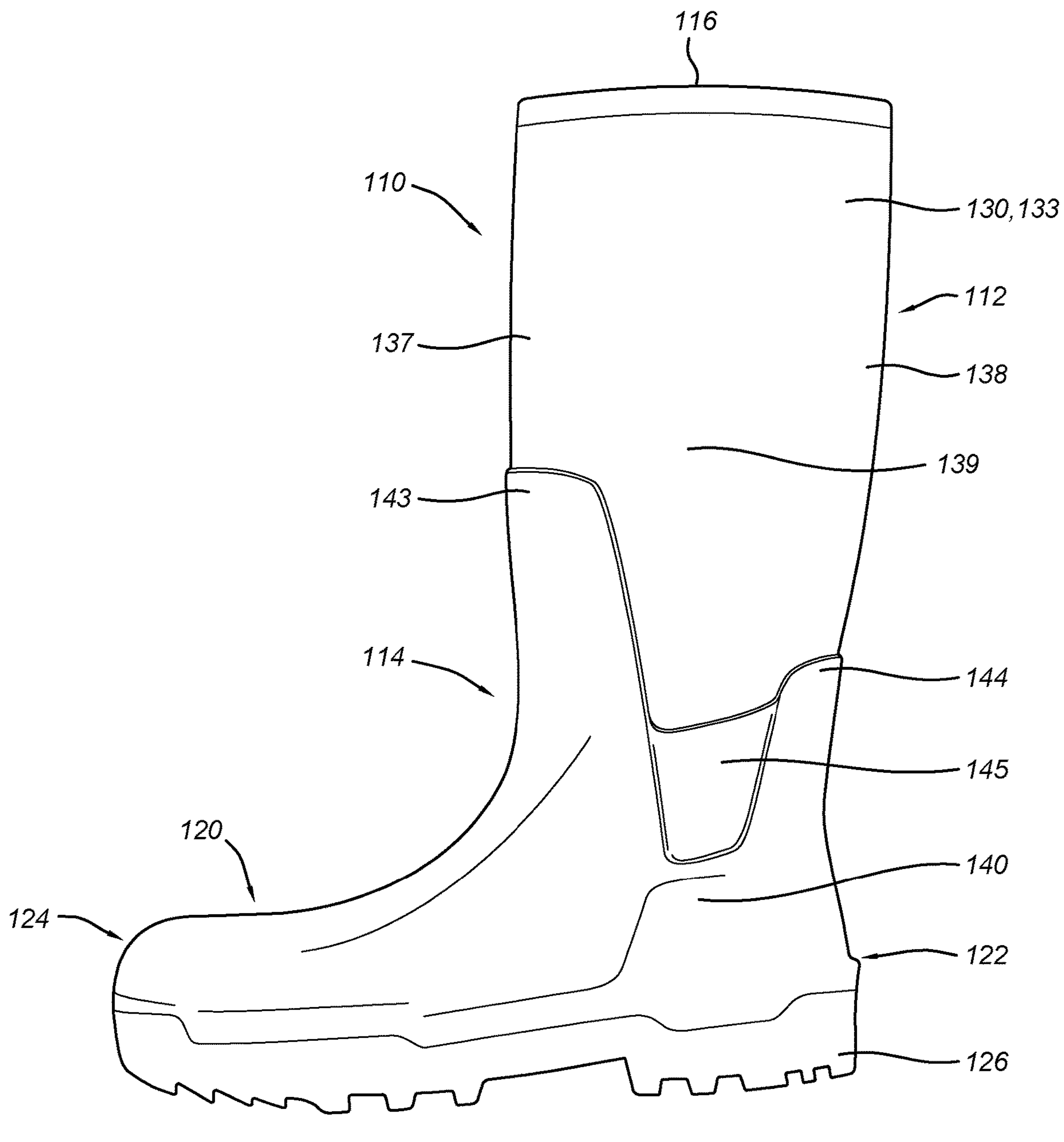
FIG. 6*a* shows a side view of the footwear embodiment from FIGS. 5*a*-5*b;*
Figures 6B, 6C:
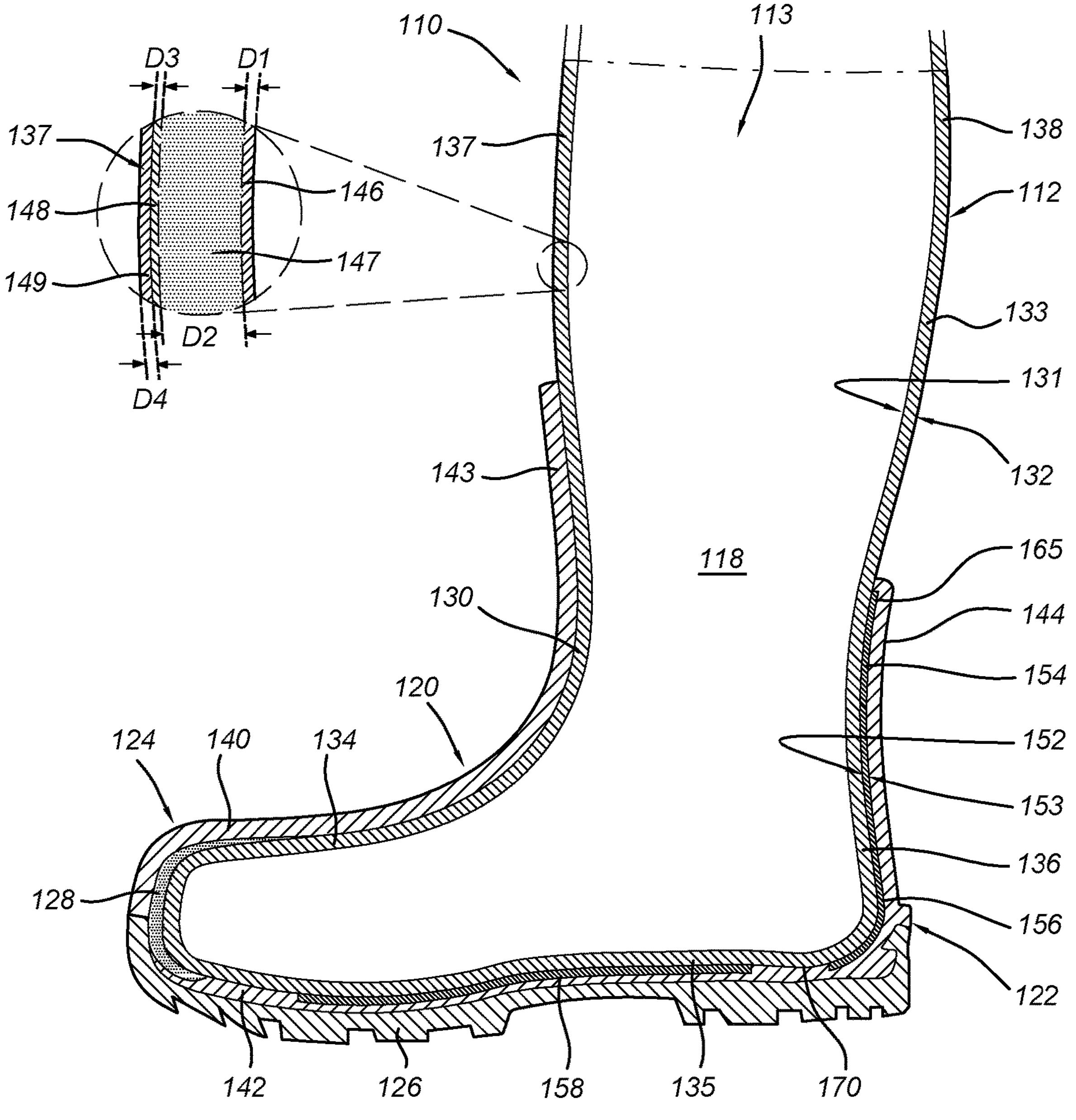
FIGS. 6*b*-6*c* shows sagittal cross-sectional views of the footwear embodiment from FIGS. 5*a*-6*a;*

FIGS. 6*a* and 6*b* show lateral and sagittal cross-sectional views of the boot 110 from FIGS. 5*a*-*b*. FIG. 6*b* illustrates that the liner 130 has a foot portion 134 adapted to cover the wearer's foot, and a leg portion 133 extending upwardly and adapted to cover the wearer's ankles, shin, and calf, up a part of the wearer's leg.

The shell 140 includes an integrally molded foot portion that covers and extends completely around the foot portion 134 of the liner 130. At a bottom side, the shell 140 includes a midsole portion 142 that is sandwiched between the outsole 126 on the one hand, and the liner 130 and insert 150 on the other hand. The shell 140 further includes a front portion 143, a rear portion 144, and two lateral portions 145, which extend upwards along the shaft 112. The lateral shell portions 145 interconnect the front and rear shell portions 143, 144 along the periphery of the shaft 112, but extend over smaller heights along the shaft 112 to cover only ankle portions of the liner 130. These lateral shell portions 145 have a reduced thickness to increase flexibility, and to allow the front and rear shell portions 143, 144 to flex outwards relative to each other.

FIG. 6*b* further illustrates the insert 150, which is interposed between the shell 140 and the liner 130, and extends along a sole portion 135 and heel portion 136 of the liner 130. The outward surface 153 of the insert 150 faces towards and abuts part of an inward surface of the shell 140. The inward surface 152 of the insert 150 faces inwards towards void 118, and abuts the outward surface 132 of the liner 130. The insert 150 is embedded in the flexible material of the shell 140, such that the inward surface 152 of the insert 150 is level and forms a smooth continuum with the directly surrounding inward surface portion of the shell 140, and such that the outward surface 153 of the insert 150 is sunken within the flexible material and below the directly surrounding inwards surface portion of the shell 140.

The heel counter 156 extends along the heel portion 136 of the liner 130. The shank 158 is interposed between the midsole portion 142 of the shell 140 and the sole portion 135 of the liner 130. The protruding portion 154 projects upwards from the heel counter 156 along the rear shell portion 144, but remains just below an upper rear edge of the rear shell portion 144.

The heel aperture 170 is located in the heel portion 136 of the liner 130, and allows the flexible material of the insole 142 to extend through this aperture 170 and form a flexible pad for the wearer's heel.

FIG. 6*b* further illustrates that the boot 110 may include a separate toecap 128 in the nose 124, and arranged between the shell 140 and the liner 130. This toecap 128 may be made from metal, rigid plastic, or wood, and protects the wearer's toes against crushing forces from heavy objects.

In this exemplary boot 110, the exposed portions of the liner 130 include a front shaft portion 137, two opposite lateral shaft portions 139, and a rear portion 138. The exposed front portion 137 extends from the upper edge 116 downwards along part of the wearer's shin. Each of the lateral shaft portions 139 is located on a respective lateral side of the shaft 112, and extends from the upper edge 116 downwards to just above a corresponding ankle. The rear shaft portion 138 extends from the upper edge 116 downwards along part of the wearer's calf.

FIG. 6*c* shows part of the liner 130 structure. The liner 130 forms a waterproof sock, which is formed of a plurality of overlapping and adjoining layers that jointly form a flexible laminate. This laminate is composed of a first layer 146, a second layer 147, a third layer 148, and a fourth layer 149.

The first layer 146 is formed of a flexible fabric material, which has water vapor permeable properties and a high in-plane tensile strength. This first layer 146 defines the inward surface 131 of the liner 130 that delimits the contour of the interior void 118. The first layer 146 may have a thickness D1 in a range of 0.2 millimeters to 0.5 millimeters, and in this example about 0.35 millimeters.

The second layer 147 is formed of a relatively thick but flexible layer of water vapor permeable material, which is affixed to and covers the outer surface of the first layer 146. The second layer 147 consists essentially of an open-celled foam material, which is compressible to allowing the liner 130 to deform and fit snugly around the wearer's foot, and to slightly press against the wearer's foot in a uniform, well-distributed, but dynamically adaptable manner, without locally overstressing (e.g. pinching off) particular foot regions. The second layer 147 may have an uncompressed thickness D2 in a range of 1 millimeters to 11 millimeters, and in this example about 6 millimeters. This second layer 147 is compressible, such that the second layer 147 may temporarily and locally obtain a reduced thickness of down to one tenth of the uncompressed thickness D2 when subjected to compression forces along the thickness direction. This open cell foam may additionally have anti-bacterial properties.

The third layer 148 consist essentially of a waterproof but water vapor permeable membrane, and is affixed to and covers the entire outer surface of the second layer 147. This membrane 148 is formed of an ultra-thin moisture barrier, which allows moisture vapors to escape from the interior void 118, while preventing outside water from penetrating the interior void 118. This membrane 148 may for instance be one of a microporous PU, microporous polyester, or microporous polytetrafluoroethylene film. The third membrane layer 148 may have a thickness D3 in a range of 0.2 millimeters to 0.5 millimeters, and in this example about 0.35 millimeters.

The fourth layer 149 forms a protective and decorative cover, which is affixed to and covers the outer surface of the third layer 148. The fourth layer 149 is formed of a strong durable cloth or fabric, having an outer surface that corresponds to the outward surface 132 of the liner 130 and that provides an outwardly attractive appearance. This fourth layer 149 may have water-repellent properties, and/or have one or more selected colors and/or visual features for aesthetic purposes. The fourth layer 149 may have a thickness D4 in a range of 0.2 millimeters to 0.5 millimeters, and in this example about 0.35 millimeters.

The liner 130 thus forms a laminated structure, wherein the first layer 146 and fourth layer 149 form inner and outer layers respectively, between which the second and third layers 147, 148 are interposed. Each pair of directly adjacent layers is interconnected by lamination using an adhesive or diffusion bonding, mechanical bonding, or a combination thereof. The composite laminate structure of the flexible liner 130 with a plurality of distinct layers 146-149 allows separate optimization of tensile strength, compressibility, breathability, and water resistance of the liner 130.

The foot fits snugly inside the interior void 118 of the boot 110. As the shell 140 does not cover the shaft portions 137-139, these exposed portions 137-139 remain flexible when the boot 110 is worn. When the wearer inserts a foot into the void 118, takes off the boot 110, or flexes his/her lower leg relative to the foot, the exposed portions 137-139 and lateral shell portions 145 easily deform without requiring a large force. As a result, the boot 110 is comfortable to put on, wear, and take off.

Figures 7A, 7B:
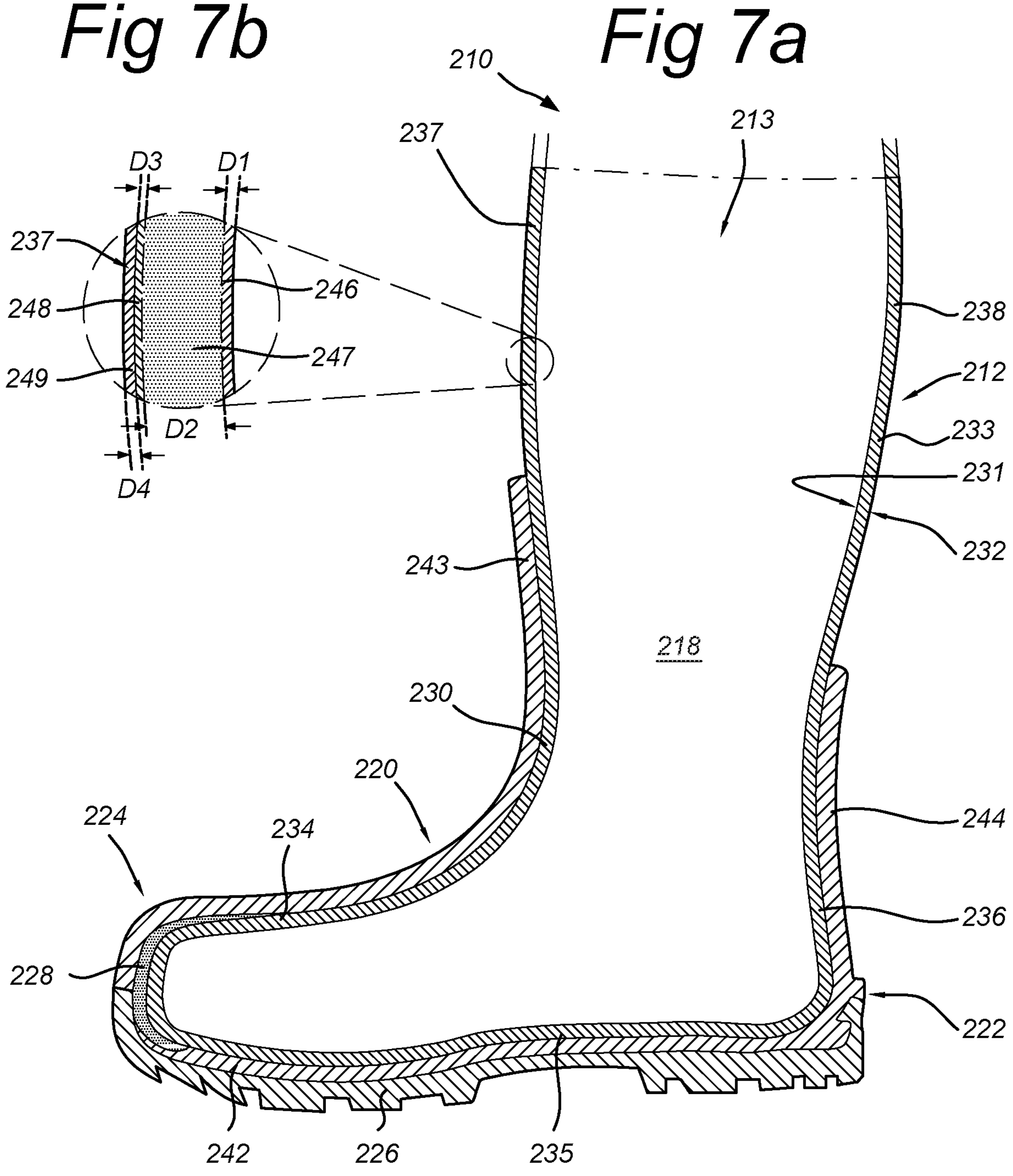
FIGS. 7*a*-7*b* show sagittal cross-sectional views of an article of footwear according to yet another embodiment, and FIGS. 8*a*-8*c* schematically show another embodiment of a moulding method.

FIGS. 7*a*-7*b* show another embodiment of a boot 210. Features in the boot that have already been described above with reference to the previous boot embodiments (and in particular FIGS. 5*a*-6*c*) may also be present in the boot 210 shown in FIGS. 7*a*-7*b*, and will not all be discussed here again. For the discussion with reference to FIGS. 7*a*-7*b*, like features are designated with similar reference numerals preceded by 200, to distinguish the embodiments. This exemplary boot 210 includes a liner 230 with a similar layered structure as shown in FIG. 6*c*, but omits a 3-part structural insert 150 as shown in FIGS. 5*b* and 6*b*.

Figure 8A:
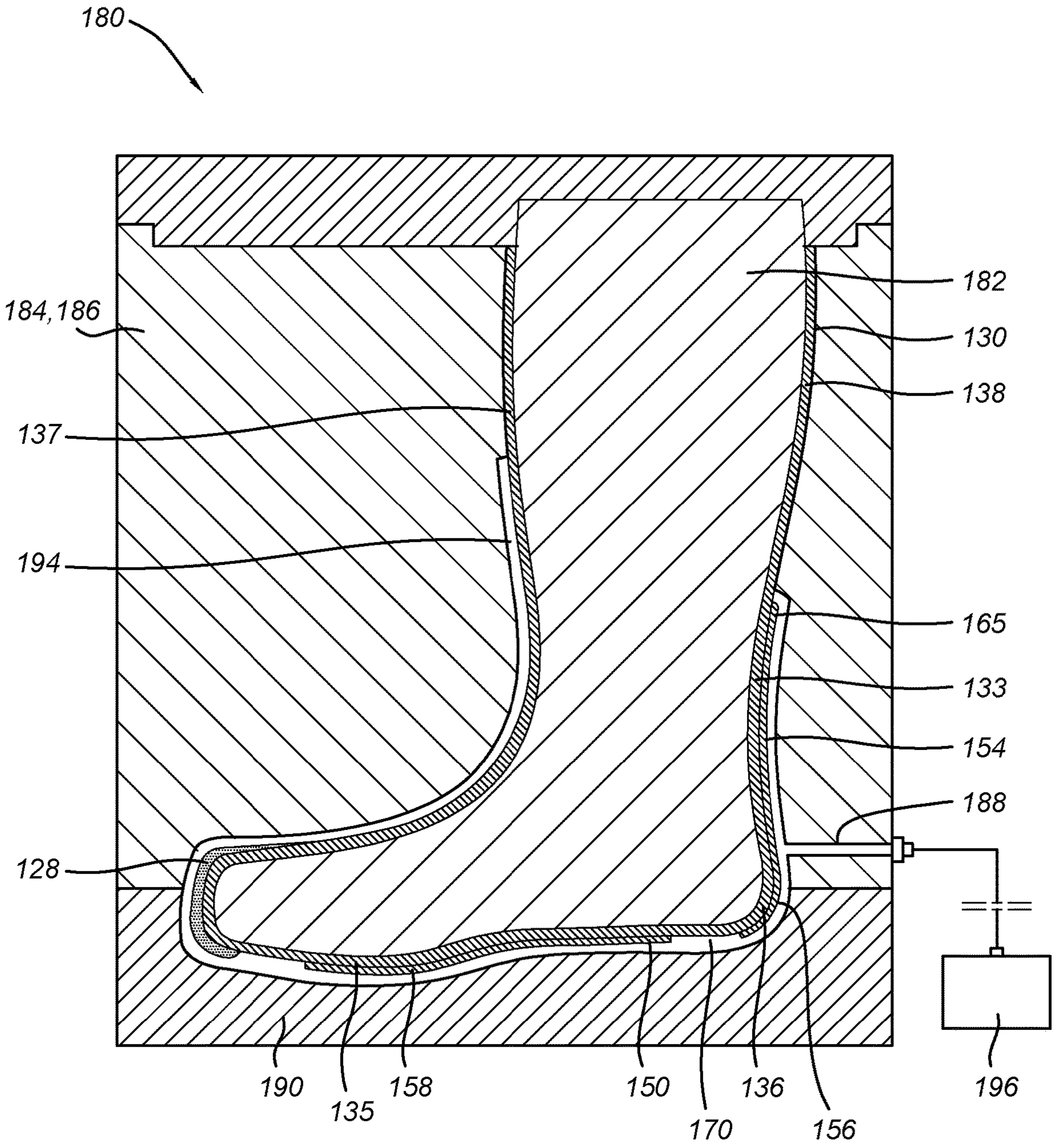
Figure 8B:
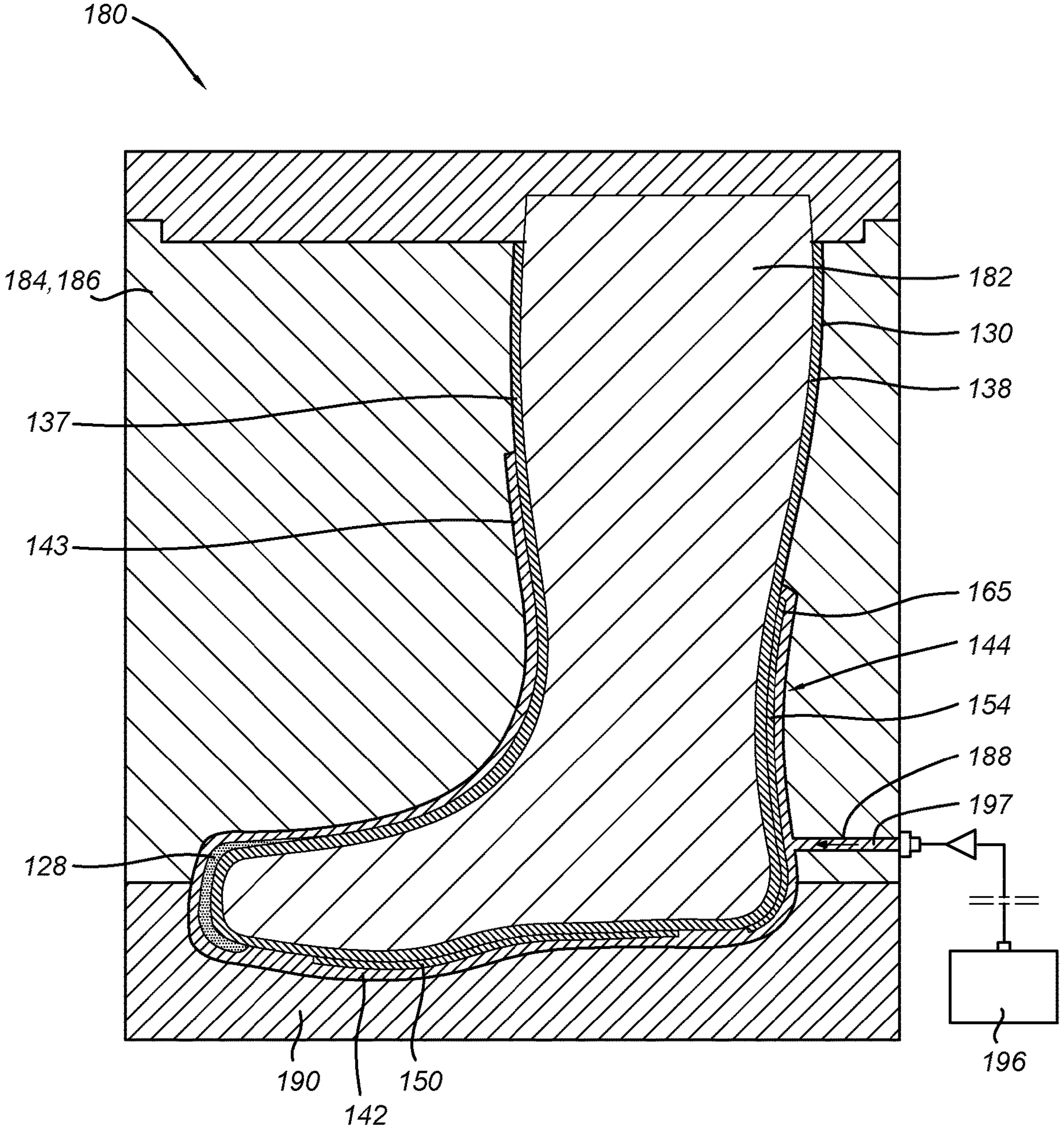
Figure 8C:
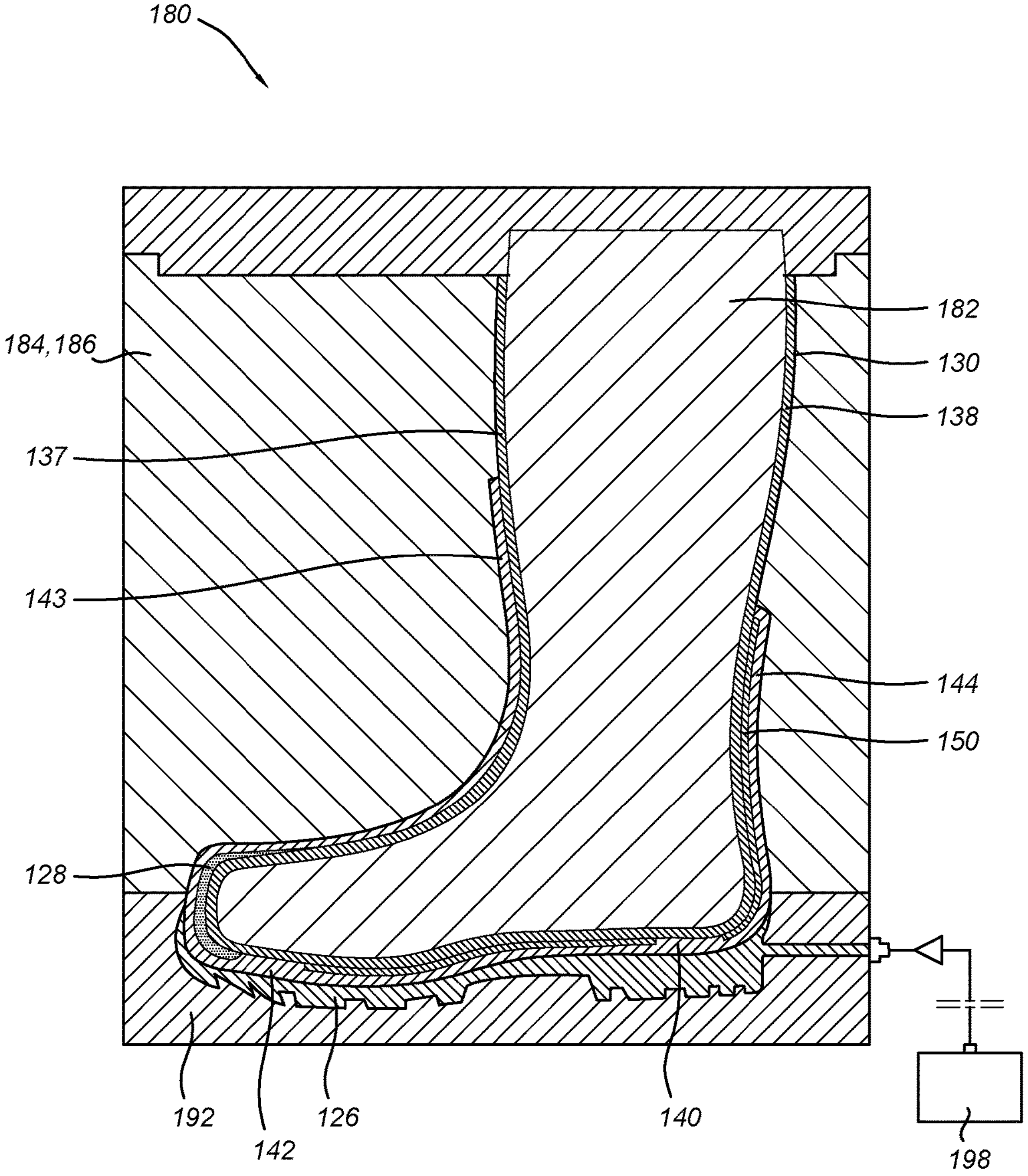

FIGS. 8*a*-8*c* schematically illustrate a method for manufacturing an article of footwear, for instance a boot 110 as shown in FIGS. 5*a*-5*c*. An initial step, which is also part of this method and which precedes the steps in FIGS. 8*a-c*, has already been described with reference to FIG. 4*a*. A last 182 is initially provided (FIG. 4*a*), which will occupy the inner void 118 of the boot 110 during subsequent moulding stages. A multi-layered compressible liner 130 is placed around the last 182, so that the liner 130 defines i.a. a foot portion 134 including a sole portion 135 and a heel portion 136, as well as a leg portion 133 including a front, lateral, and rear shaft portions 137, 139, 138. An insert 130, which is formed as a monocoque body and includes a protruding portion 154, a heel counter 156, and a shank 158, is subsequently provided (FIG. 4*a*). This insert 150 has a mechanical equilibrium shape in which the protruding portion 154 is tilted forwards along the positive longitudinal direction X relative to the heel counter 156 and the shank 158.

The insert 150 is placed on the outward surface 132 of the liner 130, so that the protruding portion 154 covers a rear part of the leg portion 133 of the liner 130, that the heel counter 156 covers the heel portion 136 of the liner 130, and that the shank 158 covers the sole portion 135 of the liner 130. When the insert 150 is placed over the last 182 and liner 130, the rear leg regions of liner 130 and last 182 urge and pivot the protruding portion 154 of the insert 150 clockwise (i.e. rearwards along the negative longitudinal direction −X) about pivot region 166 on the upper side of heel counter 156, to impart a pre-stress on the protruding portion 154. The pre-stress will be largely maintained by the liner 130 after the last 182 is removed and moulding has completed. Because of this pre-stress, the upper edge 165 of portion 154 of the embedded insert 150 is deflected rearwards over an arc length of approximately 10 millimeters about pivot region 166, relative to the slightly forwards sloped equilibrium position of this portion 154 for the insert 150 in unstressed state. The resulting pre-stress causes the protruding portion 154 to exert a forward moment on the liner 130 and the heel and Achilles tendon of the foot in the interior void 118, and thus improves internal grip.

FIGS. 8*a-c* schematically shows details of a moulding system 180, including moulding shells 184, 186 of which only one is shown, a blind sole plate 190, a second sole plate 192, and supply mechanisms 188, 190 for supplying liquid injection moulding material 197. In this example, the moulding material 197 is a PU. Relative movability of the last 182, moulding shells 184, 186, and sole plates 190, 192 is obtained by dedicated positioning mechanisms, which have been omitted in FIGS. 8*a-c* for clarity.

FIG. 8*a* illustrates that the last 182 with the liner 130 and insert 150 is placed in a space that is enclosed from lateral directions by the outer moulding shells 184, 186, and from a lower direction by the blind plate 190. A moulding cavity 194 is defined between a joint inner surface of the outer moulding shells 184, 186 and the blind plate 190 on the one hand, and the outer surfaces of the insert 150 and (part of) the liner 130 on the other hand. On a rear side, this moulding cavity 194 extends to just above the upper rear edge 165 of the protruding portion 154 of the insert 150. The moulding shells 184, 186 abut the liner 130 in the front, lateral, and rear shaft portions 137-139, so that the moulding cavity 194 does not extend up to and along these shaft portions 137-139.

FIG. 8*b* illustrates that liquid moulding material 197 (e.g. liquid PU) is injected by source mechanism 196, via a supply channel 188 through a heel part of moulding shells 184, 186, into the moulding cavity 194. The liquid moulding material 197 uniformly flows from the supply channel 188 through the cavity 194 and across the exposed outer surface portions of the liner 130 and the insert 150. The injected moulding material 197 in the cavity 194 is allowed to cure, to form the shell 140 with the midsole portion 142 around the liner 130 and the insert 150. In the resulting arrangement, the insert 150 is enclosed between the liner 130 and the shell 140, and is partially embedded in the PU material of the shell 140.

As illustrated in FIG. 8*c*, the blind plate 190 is removed from the lower part of the moulding shells 184, 186 and the midsole portion 142, after the shell 140 has cured. The blind plate 190 is replaced by the second sole plate 192 with a different profile, to form an outsole cavity below the cured midsole portion 142. Liquid moulding material is injected by source 198 into this outsole cavity, and this material is allowed to cure to form the outsole 126 of the boot 110.

Finally, the moulding shells 184, 186 and the second sole plate 192 are removed, and the resulting boot 110 is released from the last 182.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

In the exemplary embodiments described herein above, the flexible material of the upper and midsole portion consists essentially of PU formed with a RIM technique. In alternative embodiments, the injection molded flexible material of the upper and midsole portion may consist essentially of synthetic rubber, PVC, EVA, TPU, or other suitable thermosetting or thermoplastic polymers.

Footwear products are known that include a shaft and a liner that extend over the wearer's ankles and lower leg, and which are watertight but still reasonably comfortable to wear. For instance, patent document US2013/0239439A1 describes a boot that comprises a waterproof full-foot neoprene sock with interconnected foot and leg portions, and an outer layer that is molded directly onto and around the foot portion of the neoprene sock, while leaving the sidewall and calf-side portions of the sock substantially uncovered by the molded outer layer. Although the neoprene sock confers substantial flexibility on the boot, the required waterproofness of this sock has a negative impact on the climate inside the boot, and will cause the interior of the boot to become noticeably damp after prolonged wearing. It would be desirable to provide a footwear product, for instance a boot or high-top, which provides improved comfort for the wearer.

Therefore, according to another aspect of the present disclosure, there is provided a waterproof footwear product 110, for instance a boot or high-top. The waterproof footwear product comprises an upper 114 and an outsole 126 that is fixed to the upper. The upper includes a liner 130 and a molded waterproof shell 140. The liner defines an inward surface 131 that encloses an interior void 118 for accommodating a foot, and forms a foot portion 134 and a leg portion 133. The molded waterproof shell envelops at least the foot portion of the liner. The liner is formed of a plurality of overlapping and adjoining layers 146, 147, 148, 149, which jointly form a laminate and include a first layer 146 that consists essentially of a flexible fabric with a high strength, a second layer 147 that consists essentially of a compressible open-cell foam, and a third layer 148 that consists essentially of a waterproof but water vapor permeable membrane.

The composite laminate structure of the flexible liner with (at least) three separate layers facilitates separate optimization of strength, flexibility, compressibility, water vapor permeability, and water resistance properties of the liner, to provide footwear with a high level of comfort and durability.

The fabric of the first layer has considerable strength, al as well as out-of-plane structural flexibility to sustain folding or bending without breaking or permanently deforming. The first fabric layer may for instance be formed of interwoven synthetic fibers with a high ultimate tensile strength. Breaking forces (i.e. forces recorded at the point of rupture) for the resulting liner may be at least 200 Newton (N), for instance 400 N, and/or of up to 800 N, measured along the warp and weft directions of the fabric layer and by test procedures according to EN ISO 13934-1. Alternatively or in addition, the strength characteristics of the first layer may relate to a tear strength (i.e. a required force for creating and further developing a local tear) of at least 5 N, for instance 15 N, and/or of up to 25 N, measured along the warp and weft directions of the fabric layer and by test procedures according to EN ISO 13934-1. The high strength of the first layer strongly reduces the likelihood of tearing the liner during use. The first layer may have a thickness in a range of 0.2 millimeters (mm) to 0.5 mm, preferably in a range of 0.3 mm to 0.4 mm, and for instance about 0.35 mm.

Alternatively or in addition, the strength properties of this layer may include a high abrasion resistance, in particular when the first layer forms an innermost liner layer that directly faces the interior void. This abrasion resistance may be defined by EN ISO 12947-2:1998/C1:2002, and tested with a procedure according to EN ISO 20344 in which the layer is periodically subjected to a weight of 12 kilopascal until at least one fiber in the fabric is completely ruptured. The abrasion resistance of the first layer may comply with at least 26000 cycles in a dry state, and at least 13000 cycles in a wet state, until the occurrence of fiber rupture.

The second layer with open cell foam is compressible, thus allowing the liner to deform and fit snugly around the wearer's foot and to slightly press against the wearer's foot in a uniform, well-distributed, but dynamically adaptable manner, without locally overstressing (e.g. pinching off) particular foot regions. This increases wearer comfort and reduces the probability that the foot is inadvertently pulled out of the footwear product. The density of the foam may be in a range of 60 to 130 grams per liter (g/l), and for instance about 95 g/l. The second layer may have an uncompressed thickness in a range of 1 millimeters to 11 millimeters, preferably in a range of 3 millimeters to 9 millimeters, and for instance 6 millimeters. The compressibility of the second layer may be such that it may temporarily and locally obtain a reduced thickness in a range from one half to one tenth of the uncompressed thickness, when subjected to compression forces along the thickness direction. Preferably, this second layer is substantially elastically compressible, so that it may temporarily and locally obtain a reduced thickness when subjected to compression forces, but will largely or entirely rebound to its original thickness when the compression is removed.

The open cell foam helps in regulating the climate inside the footwear product. The reticulated structure of the foam renders the second layer permeable to air, to promote ventilation. The reticulated structure also confers a significant liquid absorption capability on the second layer, which allows the liner to act as temporary absorption reservoir for moisture originating from the interior void (e.g. perspiration). Water absorption characteristics of the second layer may be at least 75 milligrams per square centimeter ($mg/cm^2$), for instance about 125 $mg/cm^2$, and/or of up to 175 $mg/cm^2$, measured by a test procedure according to EN ISO 20344:2011. The open cell foam may further have good moisture wicking properties, so that is pulls moisture absorbed from the interior region of the boot towards the outer layers of the liner, where it can evaporate more easily. The open cell foam may also have anti-bacterial properties.

The membrane forming the third layer is waterproof but permeable to water vapor (which may also be referred to as "breathable"). Preferably, the waterproofness and water vapor permeability of the liner are primarily determined by the properties of this third layer. The waterproof properties of the membrane may confer on the liner a waterproof rating (i.e. penetration resistance of a fabric to hydrostatic pressure of a water column) in a range of 1000 mm to 10000 mm, for instance 5000 mm, measured by a test procedure according to ISO 811:1981. The vapor permeability properties of the membrane may confer on the liner a water vapor transmission rate (WVTR) of at least 0.8 milligrams per square centimeter per hour ($mg/cm^2 \cdot h$), for instance 2.5 $mg/cm^2 \cdot h$, and/or of up to 4.0 $mg/cm^2 \cdot h$, measured by a test procedure according to EN ISO 20345:2011. Alternatively or in addition, the vapor permeability properties of the membrane may confer on the liner a water vapor coefficient of at least 20 milligrams per square centimeter ($mg/cm^2$), also measured by a test procedure according to EN ISO 20345:2011.

In embodiments, the first layer 146 directly borders and faces the interior void 118, and is successively covered by the second layer 147 and the third layer 148 respectively. This ordering of said three layers, and in particular a third layer that is at or close to the outward surface of the liner, ensures that the third layer will prevent water originating from outside the footwear product from entering the footwear product. This water cannot soak the first and second layers, nor pass through to the footwear interior.

In embodiments, the overlapping and adjoining layers 146, 147, 148, 149 further comprise a fourth layer 149, which defines an outward surface 132 of the liner 130, and which consists essentially of a fabric with high tear strength and tensile strength.

The fourth outer layer of strong fabric may be added, to increase durability of the liner. This fourth layer may also be designed to provide the liner with an appealing aesthetic appearance. The fourth layer may have a thickness in a range of 0.2 millimeters to 0.5 millimeters, preferably in a range of 0.3 millimeters to 0.4 millimeters, for instance about 0.35 millimeters. The fabric of this fourth layer may also be formed of woven synthetic fibers with a high ultimate tensile strength. The first and fourth layers may jointly confer on the liner the breaking force of at least 200 N, for instance 400 N, and/or of up to 800 N, measured along the warp and weft directions of the fabric layers. The characteristics of the fourth layer may also include a tear strength of at least 5 N, for instance 15 N, and/or of up to 25 N, along warp and weft directions. The layers may cooperate to confer on the liner a combined tear strength of at least 30 N.

In embodiments, the open-cell foam of the second layer 147 consists essentially of a substantially elastically compressible open cell polyurethane foam. The PU foam may be substantially elastically compressible and have a low compression set, so that only little permanent deformation remains after removal of an applied force. The compression set of the open cell PU foam may for instance be in a range from 0% to 10%, and for instance about 5%, measured by a method A test procedure according to DIN EN ISO 1856: 2007. The low compression set assures that temporary deformations of the liner that occur while wearing the footwear will be largely (or even entirely) reversible. This low compression set ensures longevity of the comfortable fit, and provides an improvement over liners made of neoprene, which typically have a larger compression set of e.g. 70% or more. The PU open cell foam structure may further confer on the second layer a water desorption characteristic of at least 90% and potentially up to 100%, measured by a test procedure according to EN ISO 20344: 2011.

In embodiments, the membrane in the third layer 148 is a microporous polyurethane film, a microporous polyester film, or a microporous polytetrafluoroethylene film. The film may have a thickness in a range of 20 micrometers to 40 micrometers, for instance about 30 micrometers.

In embodiments, the shell 140 is directly molded and affixed onto the liner 130, so that the liner is non-removable from the footwear product 110. The shell is preferably molded directly onto the liner by an injection moulding process—for instance via reaction injection moulding (RIM) of a thermosetting polymer, or injection moulding of a thermoplastic polymer—to yield a flexible continuous (i.e. unitary) layer of molded material that tightly envelops and is permanently fixed to the liner. The proposed insert may thus be incorporated in a footwear product via a manufacturing process that is largely relies on known injection moulding techniques, and which requires no or relatively little adaptation of the existing moulding components (e.g. the last, moulding shells, and sole plates).

The insert 150 may be embedded in the flexible material of the shell 140, such that an outward surface of the insert lies sunken relative to (i.e. within and below) the directly surrounding inward surface of the upper and midsole portion. An inward surface 152 of the insert may be level with the directly surrounding inward surface of the shell, so that these inward surfaces jointly form a smooth continuous surface that abuts and envelops part of the outward surface 132 of the liner.

In embodiments, the leg portion 133 of the liner 130 extends upwards from the foot portion 134 and beyond the shell 140 to form a shaft 112, and one or more shaft portions 137, 139, 138 of the liner remain exposed and uncovered by the shell 140.

The exposed shaft portions that are not covered by the molded shell remain flexible when the footwear product is worn. When the wearer inserts a foot into the interior void, takes off the boot, or flexes his/her lower leg relative to the foot, the exposed shaft portions easily deform without requiring a large force. This renders the footwear product more comfortable to use.

In further embodiments, the shell 140 extends upwards and only partially along the leg portion 133 of the liner 130, to define a front shell portion 143 on a shin-side of the shaft 112, a rear shell portion 144 on a calf-side of the shaft 112, and lateral shell portions 145 on opposite lateral sides of the shaft. The lateral shell portions 145 may have a reduced thickness relative to the front and rear shell portions, to locally increase an in-plane flexibility and allow the front and rear shell portions to temporarily deflect outwards when a foot is inserted into the interior void 118.

In embodiments, the waterproof footwear product 110 further comprises an insert 150 formed of a material with an increased hardness and stiffness relative to the shell 140, and arranged between the liner 130 and the shell. This insert is formed as a single body that includes a protruding portion 154, a heel counter 156, and a shank 158. The protruding portion extends upwards from the heel counter and along the rear shaft portion of the liner, and provides a guiding trajectory for a heel of the foot during insertion into the interior void 118.

The unitary insert with the integrated shank, the heel counter, and the protruding portion forms a single stabilizer member with three-fold functionality. The shank forms an integral part of the insert, and extends from the heel portion along the sole and to the region near the toes, to form a reinforcing arch support between the heel and the frontal region of the foot sole. The shank may confer increased stiffness and torsional resistance against rotational deformation of the sole portion about a longitudinal direction (i.e. against rotation of the nose portion relative to the heel portion, about a nominal axis that extends from the heel to the toes). The heel counter also forms an integral part of the insert, and extends around lateral and rear parts of the liners heel portion, to confer increased rigidity to the article's heel portion. An inward surface of the heel counter conforms to the outward heel surface, which helps to reduce or prevent sliding of the heel within the interior void. The heel counter may confer increased stiffness and compressional resistance against linear deformation of the heel portion along a transverse direction (i.e. between lateral sides of the heel portion). The protruding portion forms an integral part of the insert that resembles a shoehorn structure for guiding the heel when the foot is inserted into the interior void. The protruding portion projects predominantly upwards over a predetermined distance from an upper rear portion of the heel counter, and relative to upper side edges 161, 163 thereof. This distance is at least half the vertical dimension of a human heel i.e. half the height of the heel bone (calcaneus), measured from the foot sole (plantar aspect) for a foot corresponding to the size of the footwear. The heel counter of the unitary insert may cooperate with the compressible liner, to press back against the wearers heel when the user raises his/her foot, thereby holding the foot securely within the footwear product.

In further embodiments, the protruding portion 154 is deflected rearwards from a mechanical equilibrium position when arranged between the liner 130 and the shell 140, so as to be subjected to rearwards pre-stress along the negative longitudinal direction and relative to a pivot region 166 on the heel counter 156, and to exert a forward moment on the rear portion of the liner.

The rearwards deflection of the protruding portion is a deformation relative to a mechanical equilibrium shape of the insert in which the protruding portion is tilted slightly forwards relative to the heel counter. The rearwards deflection imparts a pre-stress on the protruding portion and pivot region. Conversely, the embedded, pre-stressed protruding portion exerts a forward moment on the rear shaft portion of the liner as well as on the heel and Achilles tendon of a foot in the interior void. The resulting inwards moment improves the internal grip exerted by the compressible liner and insert on the heel, and yields increased wearing comfort. The upper edge of the protruding portion may be rotationally deflected rearwards relative to the heel counter and shank over an arc length and about a pivot region on the heel counter. In exemplary embodiments, a ratio of the deflection arc length to a length of the protruding portion may be in a range of 5% to 15%, and preferably about 10%. For instance, for a protruding portion with a vertical length of about 100 millimeters, the arc length may be in a range from 5 to 15 millimeters, and may for instance be approximately 10 millimeters.

In further embodiments, the shell 140 extends upwards and only partially along the leg portion 133 of the liner 130, to define a rear shell portion 144 on a calf-side of the shaft 112. The rear shell portion includes an upper edge that is located above and near an upper rear edge 165 of the protruding portion 154 of the insert 150.

The protruding guiding portion of the insert may thus be entirely embedded inside the material of the rear shell portion, while leaving a substantial part of the rear shaft portion of the liner exposed and uncovered by the shell. This yields an optimal balance between guiding the heel while putting on the footwear product, and flexibility of the shaft while wearing the product.

In embodiments, the shell 140 consists essentially of a unitary body of molded thermosetting or thermoplastic elastomer, preferably polyurethane.

The proposed insert may be incorporated in an article of footwear that is formed using injection moulding techniques that are known per se, while requiring no or relatively little adaptation of the existing moulding components (e.g. the last, moulding shells, and sole plate). The hardness of flexible material of the upper and the midsole portion may be quantified by a shore hardness ranging from 30 to 70 shore A (metric for indentation hardness by a durometer or shore hardness test DIN ISO 868:2003).

This waterproof footwear product with layered liner and its method of manufacturing may be considered individual improvements, and their various embodiments may be subject of a divisional application.

LIST OF REFERENCE SYMBOLS

Similar reference numbers that have been used in the description to indicate similar elements (but differing only in the hundreds) have been omitted from the list below, but should be considered included.

10 footwear product
12 shaft
13 insertion opening
14 upper
18 interior void
20 instep
22 heel
24 nose
26 outsole
28 toecap
30 liner
31 inward liner surface
32 outward liner surface
33 leg portion
34 foot portion
35 sole portion
36 heel portion
38 rear shaft portion
40 molded shell
42 midsole portion
50 insert
52 inward insert surface
53 outward insert surface
54 protruding portion
56 heel counter
58 shank
60 first sidewall
61 first upper side edge
62 second sidewall
63 second upper side edge
64 rear wall
65 upper rear edge
66 pivot region
68 top opening
70 heel aperture
80 moulding system
82 last
84 first moulding shell
86 second moulding shell
88 supply channel
90 first sole plate (e.g. blind plate)
92 second sole plate
94 moulding cavity
96 injection moulding source
97 moulding material (e.g. liquid PU)
98 further injection moulding source ((e.g. supply of liquid PU)
116 upper edge
133 leg portion
137 front shaft portion
138 rear shaft portion
139 lateral shaft portion
146 first layer
147 second layer
148 third layer
149 fourth layer
A nominal pivot axis
X first direction (e.g. longitudinal direction)
Y second direction (e.g. transverse direction)
Z third direction (e.g. vertical direction)
Di thickness of insert
D1 $1^{st}$ layer thickness
D2 $2^{nd}$ layer thickness
D3 $3^{rd}$ layer thickness
D4 $4^{th}$ layer thickness
H1 height of protruding portion
H2 height of heel counter L1 length of shank
L2 arc length (of pre-stressed protruding portion)
W1 first width (of heel portion between sidewalls)
W2 second width (of top opening)
Ø aperture diameter

The invention claimed is:

1. A boot or high-top, comprising:

a liner including an inward surface that encloses an inner void for accommodating a foot, and with an outward surface that defines at least a rear shaft portion, a heel portion, and a sole portion;

an upper including a midsole portion, and surrounding at least the rear shaft portion, the sole portion, and the heel portion of the liner;

an insert formed of a material with an increased hardness and stiffness relative to the upper and the midsole portion, and arranged between the liner and the upper with the midsole portion;

wherein the insert is formed as a single body that includes a heel counter and a shank, the heel counter extending along the heel portion of the liner to surround the heel of the foot, and including a rear wall and side walls that extend up to but exclude an ankle portion of the liner such that the heel counter does not cover the ankle of the foot;

and wherein the upper and midsole portion are formed of a flexible material that is injection molded directly onto the liner and onto the insert placed on an outward surface of the liner, thereby forming the flexible material as a continuous layer that tightly surrounds and is fixed to the insert and the liner.

2. The boot or high-top according to claim 1, wherein the insert further includes a protruding portion extending upwards from the heel counter and along the rear shaft portion of the liner, the protruding portion providing a guiding trajectory for a heel of the foot during insertion into the inner void.

3. The boot or high-top according to claim 1, wherein a leg portion of the liner extends upwards from a foot portion and beyond the upper to form a shaft, and wherein one or more shaft portions of the liner remain exposed and uncovered by the upper.

4. The boot or high-top according to claim 3, wherein the upper extends upwards and only partially along the leg portion of the liner, to define a front portion on a shin-side of the shaft, a rear portion on a calf-side of the shaft, and lateral portions on opposite lateral sides of the shaft, wherein at the lateral portions of the upper, the flexible material has a reduced thickness compared to the front and rear portions of the upper, to locally increase an in-plane flexibility and allow the front and rear portions to temporarily deflect outwards when a foot is inserted into the interior void.

5. The boot or high-top according to claim 2, wherein the upper extends upwards and only partially along a leg portion of the liner, to define a rear portion on a calf-side of the shaft, the rear portion of the upper defining an upper edge that is located above and near an upper rear edge of the protruding portion of the insert.

6. The boot or high-top according to claim 1, wherein the side walls of the insert are on upper ends bounded by upper side edges that border a top opening, wherein the top opening has a width and is adapted for inserting a heel of a foot into the heel counter, and wherein the upper side edges are curved inwards relative to the side walls, so that in a rest state of the insert the width is smaller than an inner width between the side walls.

7. The boot or high-top according to claim 1, wherein the insert comprises a heel aperture with a smoothly curved periphery on a lower side of the heel portion of the liner, and wherein the flexible material of the midsole portion extends through the heel aperture and directly butts against the liner to form a flexible pad for a heel of a wearer of the boot or high-top.

8. The boot or high-top according to claim 1, wherein the flexible material of the upper and the midsole portion consists essentially of a thermosetting or thermoplastic elastomer.

9. The boot or high-top according to claim 1, wherein the insert is formed as a curved and continuous unitary shell, which defines an inward surface that is essentially congruent to an outward surface of the liner, and which has a thickness in a range between 0.5 and 3 millimeters.

10. The boot or high-top according to claim 1, wherein the insert consists essentially of a fiber reinforced plastic material.

11. The boot or high-top according to claim 1, wherein the shank extends along more than 80% of the sole portion of the liner, to extend along and provide support to an arch and a ball of the foot.

12. A method for manufacturing a boot or high-top, wherein the method comprises:

providing a last to delineate an inner void in the boot or high-top for accommodating a foot;

positioning a liner over the last, so that an outward surface of the liner defines at least a rear shaft portion, a heel portion, and a sole portion;

providing an insert that is formed as a single body, including a heel counter and a shank;

positioning the insert over the liner, so that the heel counter of the insert covers a heel portion of the liner, the heel counter including a rear wall and side walls that extend up to but exclude an ankle portion of the liner such that the heel counter does not cover the ankle of the foot, and the shank of the insert covers a sole portion of the liner, and forming an upper with a midsole portion around the insert and the liner, including injection molding of a flexible material directly onto the liner and the insert, thereby forming a continuous layer of molded material that is fixed to and tightly surrounds the liner and the insert.

13. The method according to claim 12, further comprising:

positioning at least one molding shell on an upper lateral side around the last with the liner and the insert, to delineate an outward surface of the upper, and positioning a sole plate on a lower side of the last with the liner and the insert, to delineate an outward surface of the midsole portion, so that a molding cavity for the upper and the midsole portion is formed between the last with the liner and the insert on the one hand, and the at least one molding shell and the sole plate on the other hand, and forming the upper and the midsole portion and enclosing the insert by injection molding the flexible material into the molding cavity.

14. The method according to claim 13, wherein the injection molding of the flexible material includes: embedding the insert in the flexible material such that an inward surface of the insert forms a smooth and level continuum with directly surrounding inward surface portions of the upper and the midsole portion, and such that an outward surface of the insert is sunken within the flexible material and below the directly surrounding inwards surface portions.

15. The method according to claim 12, the insert further including a protruding portion extending upwards from the heel counter to provide a guiding trajectory for a heel of the foot, the insert having a mechanical equilibrium shape in which the protruding portion is tilted forwards relative to the heel counter and the shank;

wherein positioning of the insert over the liner further comprises arranging the protruding portion over the liner so that the protruding portion of the insert covers the rear shaft portion of the liner, and that the rear shaft portion of the liner and the last urge pivot the protruding portion rearwards along the negative longitudinal direction about a nominal transverse axis through a pivot region on the heel counter, to pre-stress the protruding portion;

and wherein forming the upper with the midsole portion comprises enclosing the insert with the pre-stressed protruding portion between the liner and the upper.

16. The method according to claim 12, wherein the flexible material is a thermosetting or thermoplastic elastomer.

* * * * *